(12) United States Patent
Stearns et al.

(10) Patent No.: US 11,175,265 B2
(45) Date of Patent: Nov. 16, 2021

(54) VALVE FOR HIGH AND ULTRA-HIGH PRESSURE LIQUID CHROMATOGRAPHY

(71) Applicant: Valco Instruments Company, L.P., Houston, TX (US)

(72) Inventors: Stanley D. Stearns, Houston, TX (US); Ales Plistil, Houston, TX (US)

(73) Assignee: Valco Instruments Company, L.P., Houston, TX (US)

( * ) Notice: Subject to any disclaimer, the term of this patent is extended or adjusted under 35 U.S.C. 154(b) by 134 days.

(21) Appl. No.: 16/710,796

(22) Filed: Dec. 11, 2019

(65) Prior Publication Data

US 2020/0284768 A1    Sep. 10, 2020

Related U.S. Application Data

(60) Provisional application No. 62/813,430, filed on Mar. 4, 2019.

(51) Int. Cl.
| | |
|---|---|
| *G01N 30/20* | (2006.01) |
| *F16K 31/524* | (2006.01) |
| *G01N 30/22* | (2006.01) |
| *F16K 11/074* | (2006.01) |
| *F16K 3/10* | (2006.01) |
| *G01N 30/16* | (2006.01) |

(52) U.S. Cl.
CPC ............... *G01N 30/20* (2013.01); *F16K 3/10* (2013.01); *F16K 11/0743* (2013.01); *F16K 31/52475* (2013.01); *F16K 31/52483* (2013.01); *G01N 30/22* (2013.01); *G01N 30/16* (2013.01); *G01N 2030/202* (2013.01)

(58) Field of Classification Search
CPC .. F16K 3/10; F16K 11/0743; F16K 31/52475; F16K 31/52483; G01N 2030/202; G01N 30/16; G01N 30/20; G01N 30/22
See application file for complete search history.

(56) References Cited

U.S. PATENT DOCUMENTS

| | | | |
|---|---|---|---|
| 4,444,066 A | 4/1984 | Ogle et al. | |
| 5,819,798 A * | 10/1998 | Claflin | F16K 11/074 137/625.11 |

(Continued)

OTHER PUBLICATIONS

Harry C. Kim, Notification of Transmittal of International Preliminary Report on Patentability—PCT/US2020/013656, dated Mar. 18, 2021, 1 page, United States Patent and Trademark Office as International Searching Authority, Alexandria, Virginia, USA.

(Continued)

*Primary Examiner* — David L Singer
(74) *Attorney, Agent, or Firm* — Crain, Caton & James, P.C.; James E. Hudson, III

(57) ABSTRACT

A valve is provided for use with liquid chromatography where liquid is provided to the chromatographic analysis equipment at more than one pressure, including up to ultra-high pressures. High and higher pressure operation are provided by application of force by an internal spring while avoiding wear of components by permitting higher pressure operation by mechanical engagement of an internal element to cause the internal spring to increase the force applied to the rotor, without the addition of external additional loading in the high pressure operation.

14 Claims, 11 Drawing Sheets

(56) References Cited

U.S. PATENT DOCUMENTS

| | | | |
|---|---|---|---|
| 6,012,487 A * | 1/2000 | Hauck | F16K 11/0743 137/625.11 |
| 6,186,174 B1 * | 2/2001 | Yurchision | F16K 3/10 137/625.46 |
| 6,193,213 B1 * | 2/2001 | Stearns | F16K 3/10 137/625.46 |
| 6,202,698 B1 * | 3/2001 | Stearns | F16K 11/22 137/595 |
| 7,234,900 B2 | 7/2007 | Wang | |
| 7,377,291 B2 | 5/2008 | Moon et al. | |
| 8,876,081 B2 | 11/2014 | Tower | |
| 9,063,114 B2 | 6/2015 | Wiechers et al. | |
| 9,169,934 B2 | 10/2015 | Bunner et al. | |
| 9,194,505 B2 | 11/2015 | Tanaka | |
| 9,273,785 B2 | 3/2016 | Tanaka | |
| 9,329,157 B2 | 5/2016 | Hochgraeber et al. | |
| 9,388,908 B2 | 7/2016 | Tower | |
| 9,400,265 B2 | 7/2016 | Wiechers et al. | |
| 9,435,440 B2 | 9/2016 | Gamache | |
| 10,428,960 B2 | 10/2019 | Gamache | |
| 2013/0284959 A1 | 10/2013 | Hochgraeber et al. | |
| 2015/0184760 A1 * | 7/2015 | Moeller | F16K 11/085 251/304 |
| 2015/0198255 A1 * | 7/2015 | Gamache | F16K 5/161 137/1 |
| 2016/0377184 A1 * | 12/2016 | Hara | F16K 11/0743 73/61.56 |
| 2018/0224006 A1 * | 8/2018 | Killip | G01N 30/38 |

OTHER PUBLICATIONS

Harry C. Kim, International Preliminary Report on Patentability—PCT/US2020/013656, dated Mar. 18, 2021, 8 pages, United States Patent and Trademark Office as International Searching Authority, Alexandria, Virginia, USA.

Lee Young, Notification of Transmittal of the International Search Report and the Written Opinion of the International Searching Authority, or the Declaration—PCT/US20/13656, dated Apr. 21, 2020, 1 page, United States Patent & Trademark Office as International Searching Authority, Alexandria, Virginia, USA.

Lee Young, International Search Report—PCT/US20/13656, dated Apr. 21, 2020, 2 pages, United States Patent & Trademark Office as International Searching Authority, Alexandria, Virginia, USA.

Lee Young, Written Opinion of the International Searching Authority—PCT/US20/13656, dated Apr. 21, 2020, 10 pages, United States Patent & Trademark Office as International Searching Authority, Alexandria, Virginia, USA.

* cited by examiner

VALVE FOR HIGH AND ULTRA-HIGH PRESSURE LIQUID CHROMATOGRAPHY

CROSS-REFERENCE TO RELATED APPLICATIONS

This application claims the benefit of U.S. Provisional Application No. 62/813,430, filed Mar. 4, 2019, which is hereby incorporated by reference.

STATEMENT REGARDING FEDERALLY SPONSORED RESEARCH OR DEVELOPMENT

Not Applicable.

BACKGROUND

1. Field

The present disclosure pertains to valves for use with liquid chromatography where liquid is provided to the chromatographic analysis equipment at ultra-high pressures. More particularly, the present disclosure pertains to a valve which permits high and ultra-high pressure operation by application of force by an internal spring while avoiding wear of components by permitting ultra-high pressure operation by mechanical engagement of an internal element to cause the internal spring to increase the force applied to the rotor, without the addition of external additional loading in the high pressure operation.

2. Description of the Related Art

High performance liquid chromatography (HPLC) is generally performed using pumps, injection valves, columns, and detectors scaled to deliver fluids under pressure. In some systems the fluid is provided at ultra-high pressure, which may approach or exceed twenty thousand pounds per square inch (20,000 psi). A valve may be used to control and direct the flow of fluid in connection with sample loops connected to to the valve at input and output, to control a smaller sample retained only in a rotor slot in the valve body, to receive fluid from a pump or injection, column, to direct and/or receive fluid from a column, detector, or other device. The force associated with such pressures and the need to operate between at least two positions causes extensive wear on valve components.

Problematically, the stator and rotor components of the valve operate in a dry condition, free of any liquid sealants or lubricants which could contaminate the liquid controlled by the valve. It has previously been recognized that a constant force, particularly one sufficient to ensure operation at ultra-high pressure, to maintain a sealed contact between the stator ports and rotor slots in the valve, is not necessary at all times when the rotor is positioned and the valve is used, as the increased force increases the rate of wear on components. Current sample injection and switching valves are limited by materials of construction in excess of 20,000 psi as surface-to-surface friction is destructive at ultra-high pressures regardless of whether the surfaces are ceramic, metallic, or polymeric.

One system for increasing the force applied to the rotor to increase pressure between the rotor and stator was disclosed in U.S. Pat. No. 6,193,213. That system, used in connection with high pressure fluids (1,000-4,000 psi, and above), used the hydraulic pressure of the fluid passing through the valve to drive a limit ring against the internal springs when the valve was stationary and in operation, and thereafter, when the fluid flow ceased or was reduced in pressure (0-1,000 psi), to remove some of the applied pressure to facilitate moving the valve. As can be appreciated, the system includes an additional drain to permit removal of the fluid which provides the additional force.

It would therefore be desirable to provide a valve system which pressurizes liquid after introduction to pressures in excess of twenty thousand pounds per square inch (20,000 psi) without the need for additional fluid and which avoids movement of components during the application of ultra-high pressure to the liquid. Further, it would be desirable to provide a valve system which permits operation in each of two pressure regimes and which avoids movement of the rotor relative to the stator when approaching, operating in, or departing the higher pressure regime.

SUMMARY

The present disclosure therefore meets the above needs and overcomes one or more deficiencies in the prior art. Because of a rotating shaft and disengagement of the rotor from it, wear by movement of the rotor relative to the stator while at a higher pressure is avoided. The single higher pressure may be at or above the minimum pressure for ultra-high liquid chromatography. Various sealing forces are used for positioning the rotor against the stator. The force may be lower, for high pressure operation, when stationary and in use but when the cam shaft and the component associated with the rotor are in a crest-to-trough relationship, or higher, for higher pressure operation, when stationary and in use but when the cam shaft and the component associated with the rotor are in a crest-to-crest relationship. If the surfaces are statically loaded beyond their maximum limit for sliding motion, they may survive without leakage. A shear seal valve can be compressively sealed at well above its useful pressure if the surfaces are not moved against each other. The valve of the present disclosure permits introduction into the valve of a sample in the mobile phase stream at a single high pressure or at a single higher pressure, avoids movement of components during the higher pressure operation, and avoids potential electromechanical positioning failures. Beneficially, the valve is maintained at a constant pressure in each regime, avoiding varying of the applied pressure during communication of fluids and during change in position.

A valve is thus provided which may be used for selectively communicating a fluid to an output port at a single high pressure in a high pressure arrangement or at a single higher pressure, the single higher pressure in excess of the single high pressure. The valve includes a valve body, a rotor, a cylindrical cam element, a cam shaft, and a spring. The valve body has a stator face with at least two ports at a valve first end, where each of the at least two ports communicates with the stator face. The valve body further has a valve body internal cylindrical shoulder at a valve second end and has a valve body cylindrical keyed passageway, which has a valve body cylindrical keyed passageway key therein. The rotor is adjacent the stator face and has at least one slot positioned or adapted for communication among two of the at least two ports. The cylindrical cam element is affixed to the rotor at a cylindrical cam element top surface, has a cylindrical cam element stopping element affixed to a cylindrical cam element side which is positioned or adapted to contact the valve body cylindrical keyed passage key. The cylindrical cam element has a cylindrical cam element bottom face having at least two cylindrical cam element crests extended therefrom, a cylindrical cam element trough intermediate each of the at least two cylindrical cam element crests, and a cylindrical cam element ramp intermediate each of the at least two cylindrical cam element crests and the laterally-adjacent cylindrical cam element trough. Each of the at least two cylindrical cam element crests has a cylindrical cam element crest height. Further, the cylindrical cam element has a wavelength including one of the at least two cylindrical cam element crests, a cylindrical cam element trough and two cylindrical cam element ramps. Notably, the cylindrical cam element is rotatable relative to the valve body. The cam shaft has a cam shaft face with at least two cam shaft crests extended therefrom, as well as a cam shaft trough intermediate each of the at least two cam shaft crests, and a cam shaft ramp intermediate each of the at least two cam shaft crests and the laterally-adjacent cam shaft trough. Each of the cam shaft crests has a cam shaft crest height. The cam shaft has a cam shaft shoulder near the cam shaft face which is adjacent the cylindrical cam element bottom face of the cylindrical cam element. The at least two cam shaft crests, the cam shaft trough and two of the cam shaft ramps equal the wavelength. The spring encircling the cam shaft and is surrounded by the valve body and the cam shaft shoulder. The spring is not connected to the cylindrical cam element but contacts at one end one of the group consisting of the valve body internal cylindrical shoulder and a bearing adjacent the valve body internal cylindrical shoulder, and contacts at the other end one of the group consisting of the bearing and the cam shaft shoulder. The spring maintains at a constant length in the high pressure arrangement, which operates at the single high pressure.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DESCRIPTION

Figure 1A:
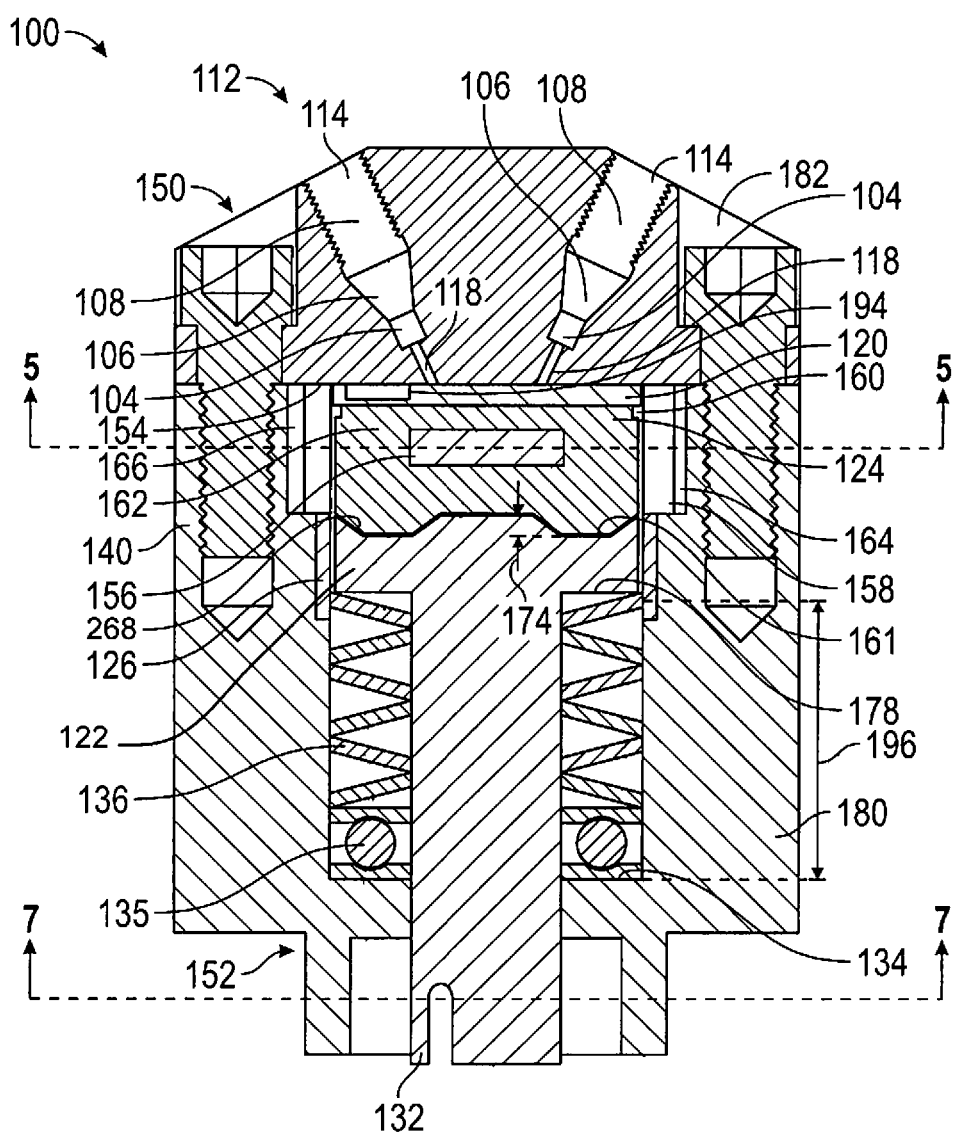
FIG. 1A is an illustration of the valve in the high pressure position, where the respective cam crests are positioned adjacent.
Figure 1B:
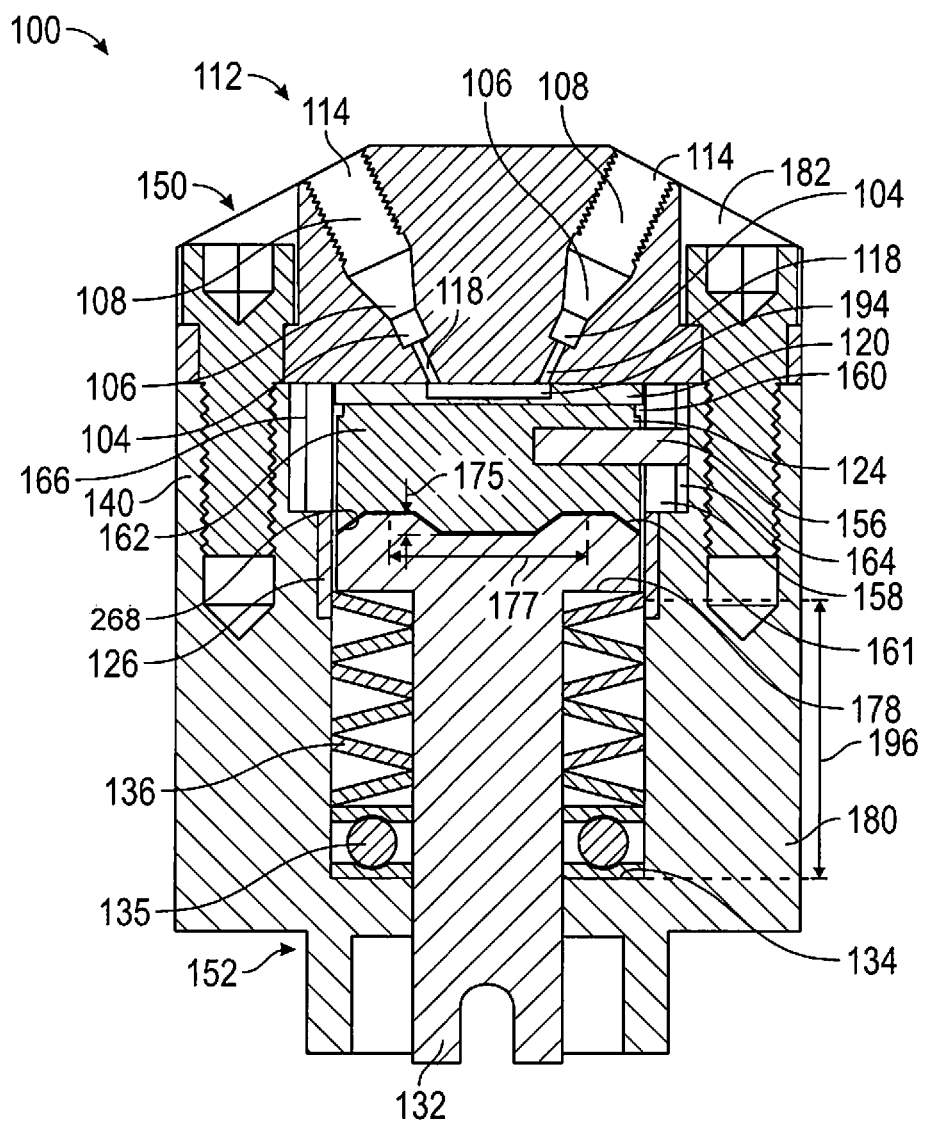
FIG. 1B is an illustration of the valve in the high pressure position, upon a rotation of a cam shaft to a valve body cylindrical keyed passageway key contacting position.
Figure 2:
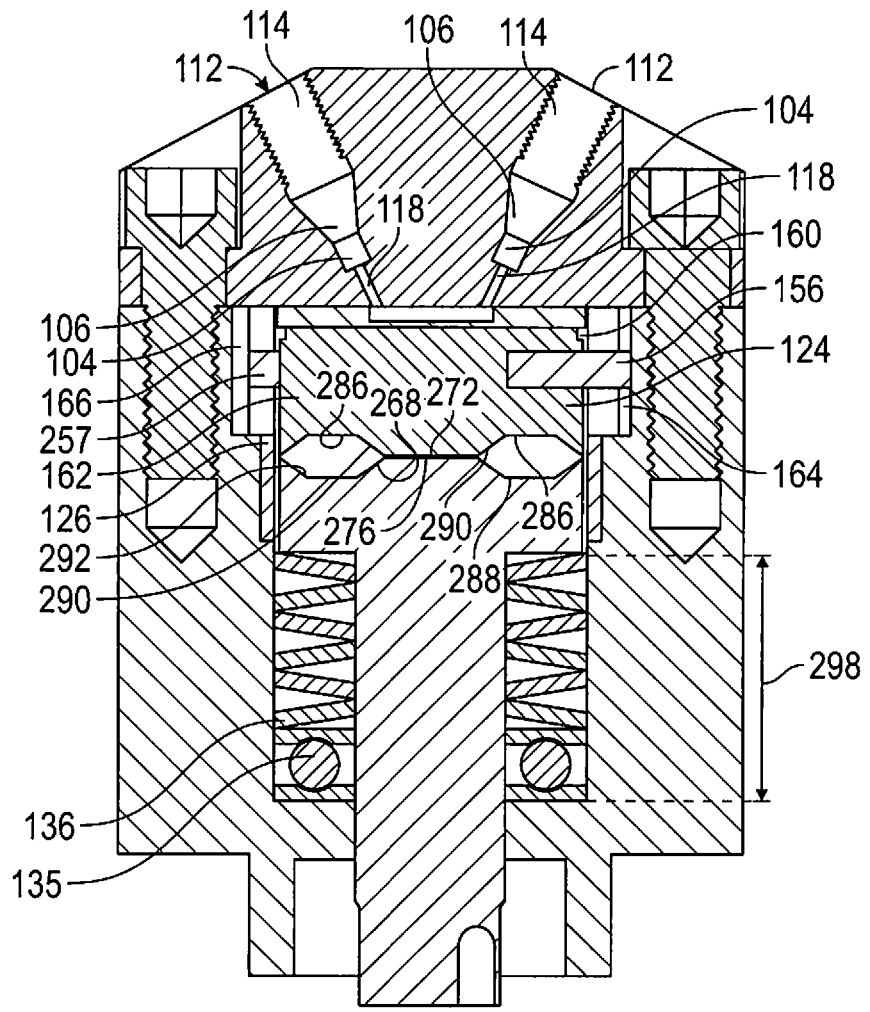
FIG. 2 is an illustration of the valve in the higher pressure position, where the respective crests are positioned atop one another.

Referring to FIGS. 1A, 1B and 2, the valve 100 of the present disclosure is provided. The valve 100 provides a mechanical switch which permits operation in each of two pressure regimes for selectively communicating a fluid to one or more output ports at of a single high pressure or a single higher pressure. The valve 100 may be used for high pressure liquid chromatography "HPLC" where operating pressures are in the range of 5800-7000 psi (39,989.60-48263.30 kPa) and for liquid chromatography where at higher pressures, including ultra-high pressure liquid chromatography "UHPLC" or "UPLC" where operating pressures are in the range of 15,000-19,000 psi (103,421.36-131,000.04 kPa), but may be above. The valve 100 of the present disclosure mechanically provides higher pressure operation while precluding higher pressure wear between a rotor 120 and a stator face 154, by limiting the application of a higher sealing force to commence after rotation of the associated cam shaft 132 by use of a rotor 120. This is accomplished by disengaging the rotor from the associated cam shaft 132 upon the cylindrical cam element 124 associated with the rotor 120 reaching a limit, by continued rotation of the cam shaft 132. The continued rotation of the cam shaft 132 alone causes the cam shaft 132 to be displaced away from the rotor 120, introducing a further compression a spring 136, which provides increased pressure for operation. Further rotation causes the cam shaft 132 to again mate to the cylindrical cam element 124, at which the spring 136 returns to the original biasing force, free of any additional loads thereon. The spring 136 thus provides the entirety of the force in the high pressure arrangement to bias the rotor 120 against the stator face 154 and without application of any additional load applied on the spring 136.

Notably, the valve 100 may move between operation at a single high pressure (which may be less than 15,000 psi (103,421.36 kPa)) and operation at a single higher pressure (which may be above 15,000 psi (103,421.36 kPa) and which may include a single higher pressure in excess of 20,000 psi (137,895.15 kPa)) while ensuring that the rotor 120 and stator face 154 never move relative to on another while at the single higher pressure. The valve 100 provides a mechanical switch which permits operation in each of two pressure regimes for selectively communicating a fluid to one or more output ports at a single high pressure or a single higher pressure when the rotor 120 is stationary with respect to the stator face 154, dependent on the communication path chosen. Likewise, the valve 100 operates to change positions, where the rotor 120 is changing position relative to the stator face 154, at the single high pressure. Depending on the position, the valve 100 may operate at a single higher pressure or a single high pressure when the rotor 120 is stationary with respect to the stator face 154 and the valve 100 is in operation.

The valve 100 thus includes a valve body 140, which includes a stator face 154, a rotor 120, a cylindrical cam element 124, a cam shaft 132, and a spring 136. Other components may be included.

The stator face 154, provided internal the valve body 140, has two or more ports 112 at a valve first end 150. The ports 112 thus communicate with the stator face 154. Each of the ports 112 in communication with the stator face 154. The valve body 140 further includes a valve body internal cylindrical shoulder 134 at a valve second end 152 which reduces the interior opening of the valve body 140 and provides a platform for the spring 136 to bias against. The stator face 154 is the external surface of the valve first end 150 and faces the valve second end 152 at the bottom of the body upper section 182. The valve body 140 has within it a valve body cylindrical keyed passageway 158 which has a valve body cylindrical keyed passageway key 164.

The rotor 120 is positioned adjacent the stator face 154 and has a slot 194 to permit communication among two of ports 112. The rotor 120 rotates relative to the stator face 154 and thus provides multiple flow paths connecting various of the ports 112 via the slot 194.

The cylindrical cam element 124 is affixed to the rotor 120 at a cylindrical cam element top surface 160 and has a cylindrical cam element stopping element 156 affixed to a cylindrical cam element side 162. The cylindrical cam element 124 and the rotor 120 are made integral and may be provided as a single part. The cylindrical cam element stopping element 156 is adapted and positioned to contact the valve body cylindrical keyed passageway key 164 upon a rotation of the cam shaft 132.

The cylindrical cam element 124 further has a cylindrical cam element bottom face 161 with at least two cylindrical cam element crests 272 extending therefrom, a cylindrical cam element trough 286 intermediate each of the at least two cylindrical cam element crests 272, and a cylindrical cam element ramp 290 intermediate each of the at least two cylindrical cam element crests 272 and the laterally-adjacent cylindrical cam element trough 286, each cylindrical cam element crest 272 having a cylindrical cam element crest height 174. A wavelength 177 is defined from one of the at least two cylindrical cam element crests 272 to a second of the at least two cylindrical cam element crests 272. Preferably, the cylindrical cam element 124 has three cylindrical cam element crests 272 and three cylindrical cam element troughs 286 with six cylindrical cam element ramps 290 to ensure greater stability than a two crest system and less aggressive ramps that a four crest system. The cylindrical cam element 124 thus has a repeating waveform at its periphery of the cylindrical cam element top surface 160. The resulting waveform need not extend to the center of the cylindrical cam element 124 given the complexities as the radius changes.

The cam shaft 132 has a cam shaft face 268 which has at its periphery at least two, and preferably three, cam shaft crests 276 extended therefrom, and which may extend to the center of the cam shaft 132, reducing in size accordingly. The cam shaft 132 further has a cam shaft trough 288 intermediate each of the at least two cam shaft crests 276, and a cam shaft ramp 292 intermediate each of the at least two cam shaft crests 276 and the laterally-adjacent cam shaft trough 288. Each of cam shaft crests 276 having a cam shaft crest height 175. Preferably, the cam shaft crest height 175 is equal to the cylindrical cam element crest height 174 so the cam shaft 132 and cylindrical cam element 124 nest or fit against one another at all surfaces. The cam shaft crest height 175 may be unequal to the cylindrical cam element crest height 174, resulting in a displacement of the cam shaft 132 of the lesser of the cam shaft crest height 175 and the cylindrical cam element crest height 174. As a result of the common structure, the at least two cam shaft crests 276 complement the at least two cylindrical cam element crests 272 by having a common wavelength 177 but potentially different amplitudes for the cam shaft crest height 175 and the cylindrical cam element crest height 174, such that regardless of the difference in height between the cam shaft crest height 175 and the cylindrical cam element crest height 174, the crests and troughs align and are of equal width. The at least two cam shaft crests 276 thus nest into the at least two cylindrical cam element troughs 286, though the at least two cam shaft crests 276 may be short of the cylindrical cam element bottom face 161. Likewise, the at least two cylindrical cam element crests 272 thus nest into the at least two cam shaft troughs 288, though the at least two cylindrical cam element crests 272 may be short of the at least two cam shaft troughs 288. The cam shaft 132 thus has a repeating waveform at its periphery of its face 268. The resulting waveform need not extend to the center of the cam shaft 132 given the complexities as the radius changes.

The cam shaft 132 further has a cam shaft shoulder 178 near the cam shaft face 268. The cam shaft face 268 of the cam shaft 132 is adjacent the cylindrical cam element 124 bottom face 161 of the cylindrical cam element 124, such that the cam shaft 132 and the cylindrical cam element 124 remain in contact at all times, although the point of contact changes.

The cam shaft 132 is rotatable with and relative to the cylindrical cam element 124 and, with its cam shoulder 178 is configured to compress the spring 136. Such compression occurs when the cylindrical cam element stopping element 156 contacts a valve body cylindrical keyed passageway key 164, 166 and each of the cam shaft crests 276 are displaced to a position atop a cylindrical cam element crest 272, which deflects the cam shaft 132 toward the valve body internal cylindrical shoulder 134 the lesser of the cam shaft crest height 175 and the cylindrical cam element crest height 174.

The spring 136 encircles the cam shaft 132 and is surrounded by the valve body 140 and the cam shoulder shaft 178. The spring 136 is retained intermediate the valve body internal cylindrical shoulder 134 and the cam shaft shoulder 178. In the absence of bearings to permit the spring 136 to rotate, the spring 136 may contact the valve body internal cylindrical shoulder 134 and the cam shaft shoulder 178 directly. The assembled distance between the valve body internal cylindrical shoulder 134 and the cam shaft shoulder 178 deflects the spring 136 and defines it length and the entirety of the force used for sealing the rotor 120 against the stator face 154 during high pressure operation, whether communicating fluid or changing position. The length, or height, of the spring 136 is, in the high pressure arrangement, a fixed value of spring first height 196. In the higher pressure arrangement, the spring 136 has a second height 298, again providing a fixed value. In neither arrangement of any change of the pressure permitted while the rotor 120 is in motion. As a result, in the high pressure arrangement, the pressure is maintained at a constant, rather than being varied, when the rotor 120 is moving. The cylindrical cam element ramps 290 and the cam shaft ramps 292 ensure the transition from high pressure arrangement to higher pressure arrangement, and the reverse, occur only with the rotor 120 is immobilized and therefore provide a single unidirectional reduction of the pressure applied, precluding any varying of the pressure at any time. Notably, the spring 136 is independent of and not connected to the cylindrical cam element 124.

The valve body 140 may include several components intended to facilitate the passage of fluid therethrough. Each port 112 may include a fitting detail 114 to provide a point of connection to other chromatographic equipment via tubing and include a threaded section 108, a tapered ferrule seat 106 and a pilot 104. Each pilot 104 is associated with a fluid passageway 118 which communicates from the port 112 to the stator face 154. Fluid flow through the valve 100 is permissible only when the stator face 154 and the rotor 120 are aligned to permit communication from the stator port on the stator face 154 associated with a fluid passageway 118 through a connecting slot in the rotor 120 to a second stator port on the stator face 154 associated a second fluid passageway 118.

Operation of the valve 100 requires the rotor 120 to be repositioned to provide alignment with the stator face 154 so the desired flow path through the valve 100. The change in position of the rotor 120, positioned adjacent and in contact with the stator face 154, is facilitated by the cylindrical cam element 124 and the cam shaft 132 which operate as a single unit in the absence of a force to overcome the structural relationship between the two.

The wave pattern provided on the cam shaft 132 and the cylindrical cam element 124 may be sinusoidal or may be sinusoidal-like, such as with flat crests and troughs and with ramps 290, 292, between those crests and troughs having a slope preferably not greater than 1.0. A plurality of cam shaft crests 276 and a corresponding number of cylindrical cam element crests 272 are required. Preferably three cylindrical cam element crests 272 and a like number of cam shaft crests 276 are provided. Four, six, or right cam shaft crests 276, and a like number of cylindrical cam element crests 272, may be employed, but the increasing number of crests results in a steeper wave from crest, flattened or sinusoidal, to corresponding trough, resulting in greater force being applied between the crests and resulting in greater wear. Flattened crests and troughs for the cam shaft crests 276, and cylindrical cam element crests 272, are beneficial as it provides a stable bearing surface between the cam shaft 132 and the cylindrical cam element 124.

Spanning both the cam shaft 132 at the cam shaft first end 122 and the portion of the cylindrical cam element 124 and having a height greater than any displacement of the cam shaft 132 is a ring 126 which ensures positioning without interfering with the cylindrical cam element stopping element 156. The centerlines of the valve body 140, the stator face 154, the rotor 120, the cylindrical cam element 124, the cam shaft 132, the spring 136 and, where present, the ring 126, are common. The cylindrical cam element 124 is thus rotatable relative to the valve body 140.

The cylindrical cam element 124 has a cylindrical cam element stopping element 156 on the side of the cylindrical cam element side 162. This cylindrical cam element stopping element 156 may be a pin or other protrusion. The cylindrical cam element stopping element 156 is thus adapted to contact the valve body cylindrical keyed passageway key 164 upon rotation of a cam shaft 132 from a first position, illustrated in FIG. 1A to the valve body cylindrical keyed passageway key contacting position illustrated in FIG. 1B. In this position, the spring 136 is maintained in compression at a first height 196. Preceding the rotation to the first position, and while the valve 100 is in the first position, such that the rotor 120 and the stator face 154 are stationary to one another, the valve is in the high pressure operation. In this position, at least two of the ports 112 on the stator face 154 are in communication with at least one of the slots 194 on the rotor 120, providing operation of the valve 100 to permit flow from one input port 112 to an output port 112 at the single high pressure and permitting movement of the valve 100 to that position at the same high pressure.

To cause the cam shaft 132 to rotate relative to the cylindrical cam element 124, the keyed passageway key 164 is positioned on the cylindrical cam element side 162 and extends into the keyed passageway 158 and is engaged by the cylindrical cam element stopping element 156, causing the cylindrical cam element 124 to stop rotation which the cam shaft 132 is further rotated. The valve body cylindrical keyed passageway 158 may be configured as a cylindrical void around or about the cylindrical cam element 124. When desirable, a keyed passageway second key 166 may be provided in the valve body cylindrical keyed passageway 158 opposite the keyed passageway key 164 to provide for like engagement and disengagement when counter-rotated.

The cylindrical cam element stopping element 156 may therefore be positioned to contact the valve body cylindrical keyed passageway second key 166. Similarly, a cylindrical cam element second stopping element 257 may be positioned on the cylindrical cam element 124, and may be opposite the stopping element 156. Each of the valve body cylindrical keyed passageway key 164 and, when applicable the valve body cylindrical keyed passageway second key 166 may be a stop affixed to the valve body 140 in the valve body cylindrical keyed passageway 158. When the cam shaft 132 rotates in the high pressure position of FIG. 1A to FIG. 1B, the cam shaft 132 engages and likewise rotates with the rotor 120. The rotor 120 is thus positioned relative to the stator face 154 for higher pressure operation.

The valve 100 includes a high pressure arrangement and a higher arrangement. During the high pressure arrangement, the valve 100 operates at a single pressure. Likewise, in the higher pressure arrangement, the valve 100 operates at a second pressure. No varying of the pressure applied in either arrangement occurs, as a constant pressure is achieved in each arrangement.

In the high pressure arrangement, each of the at least two cam shaft crests are positioned in one of the cylindrical cam element troughs 286 and the spring 136 is maintained in compression at the first height 196, such that the the spring 136 provides the entirety of the force to bias the rotor 120 against the stator face 154. No additional load is applied on the spring 136 in the high high pressure arrangement. In the high pressure arrangement, the spring 136 is at a first height 196, the deflection of which is caused entirely by the restriction of the valve body internal cylindrical shoulder 134 and the cam shaft shoulder 178.

In the higher pressure arrangement, the cylindrical cam element stopping element 156 contacts the valve body cylindrical keyed passageway key 164 to arrest rotation of the cylindrical cam element 124 relative to the cam shaft 132 in a first direction 502 and each of the at least two cam shaft crests 276 is positioned atop one of the cylindrical cam element crests 272. In the higher pressure arrangement, the cam shaft 132 is at a first deflection distant the rotor 120 and the spring 136 is maintained at a second height 298 wherein the first height 196 is greater than the second height 298 by the first deflection. No external loads are applied to increase the pressure of the rotor 120 against the stator face 154—all pressure is the result of deflection of the spring caused by the crest-to-crest position.

The valve 100 is thus able to move from high pressure arrangement to higher pressure arrangement by rotation in the first direction 502 of the cam shaft while the cylindrical cam element stopping element 156 contacts the valve body cylindrical keyed passageway key 164 and precludes rotation of the rotor 120 relative to the stator face and to move from the higher pressure arrangement to high pressure arrangement by rotation in the first direction 502 of the cam shaft 132 while the cylindrical cam element stopping element 156 contacts the valve body cylindrical keyed passageway key 164 and precludes rotation of the rotor 120 relative to the stator face 154 until each of the at least two cam shaft crests 276 is positioned in one of the cylindrical cam element troughs 286.

Referring to FIG. 2, an illustration of the valve in the higher pressure arrangement, where the respective crests 272, 276 are positioned atop one another is provided. Rotation of the cam shaft 132 after rotation of the cylindrical cam element 124 has become arrested by the contact of the cylindrical cam element stopping element 156 against the valve body cylindrical keyed passageway key 164 causes the crests to be driven out of the respective troughs, driving the cam shaft 132 toward the valve second end 152. This displacement of the cam shaft 132 relative to the valve body 140 in opposition to the spring 136 after such cam shaft 132 rotation causes the pressure between the rotor 120 and stator face 154 to increase to the higher pressure arrangement. Thus, the valve 100 then remains in the single higher pressure until the cam shaft 132 further rotates. The valve 100 can operate at either the single high pressure, such as in position illustrated in FIGS. 1A and 1B, or at the single higher pressure, as illustrated in FIG. 2. Rotation in the opposite direct is not permitted after movement to the higher pressure arrangement of FIG. 2 as the rotor 120 continues to be at the single higher pressure and such rotation would damage the rotor 120 and stator face 154.

The single higher pressure applied by the rotor 120 to the stator face 154 is a result of the increased compression of a spring 136 contained between the cam shaft 132 and the valve body 140. The rotor 120, mounted atop the cylindrical cam element 124, is maintained in contact with the stator face 154 by the force applied from the cam shaft 132. Preferably, the spring 136 encircles the cam shaft 132 and contacts at least a bearing 135 and either a shaft shoulder 178 preferably located at the cam shaft first end 122 or the the valve body internal cylindrical shoulder 134. The bearing 135 may be positioned adjacent the valve body internal cylindrical shoulder 134 or the cam shaft shoulder 178, or even intermediate them if the spring 136 is provided in two parts. When desired, a bearing 135 may be positioned adjacent the valve body internal cylindrical shoulder 134 and a second bearing 135 may be positioned adjacent the cam shaft shoulder 178. The bearing 135, while not required, is particularly beneficial in avoiding wear and potential destruction of the spring 136 during rotation of the cam shaft 132. In the absence of the bearing 135, the spring 136 contacts the valve body internal cylindrical shoulder 134 and the the cam shaft shoulder 178.

The cam shaft shoulder 178 encircles the cam shaft 132 and provides the first bearing surface for the spring 136. The valve body internal cylindrical shoulder 134, which likewise encircles the cam shaft 132, provides the second bearing surface for the spring 136. The cam shaft 132 is likewise maintained in position relative to the valve body 140 by the valve body internal cylindrical shoulder 134 adjacent the cam shaft 132 and the cam shaft shoulder 178 adjacent the valve body 140. The uniformity and mating structure of the cam shaft crests 276 and the cylindrical cam element crests 272 and the constraint of the ring 126 ensures the cam shaft 132 and the cylindrical cam element 124 remain aligned along a common axis. The distance between the valve body internal cylindrical shoulder 134 and the cam shaft shoulder 178, which is variable, determines the force applied to the cam shaft shoulder 178, and therefore by the rotor 120 against the stator face 154. The single high pressure is applied by the rotor 120 to the stator face 154 as a result of the force from the cam shaft 132 to the cylindrical cam element 124 resulting from the deflection of the spring 136 biasing the cam shaft 132 against the cylindrical cam element 124, which is fixed as the cam shaft crests 276 and the cylindrical cam element crests 272 are laterally adjacent one another, i.e. crest in trough. The single higher pressure is applied by the rotor 120 to the stator face 154 as a result of the force from the cam shaft 132 to the cylindrical cam element 124 resulting from the deflection of the spring 136 biasing the cam shaft 132 against the cylindrical cam element 124 when the cylindrical cam element crests 272 are atop the cam shaft crests 276, i.e. crest to crest and therefore causing greater deflection. A rapid increase or decrease in pressure applied results as the cam shaft crests 276 and the cylindrical cam element crests 272 slide past one another between the two end maximum positions.

The continued rotation of the cam shaft 132 and the lack of rotation of the cylindrical cam element 124 causes the cylindrical cam element crests 272 to slide past the cam shaft crests 276 until the crests are atop one another, displacing the cam shaft 132 and further compressing the springs 136 and increasing the force applied by the cam shaft 132 to the cylindrical cam element 124, thereby from the rotor 120 to the stator face 154, as illustrated by FIG. 2. This displacement pushes the cam shaft 132 closer to the valve body internal cylindrical shoulder 134, maintaining the spring 136 at a greater compression. Because of the constant force characteristic of the spring 136, this change in compression of the spring 136 increases the force applied to the cam shaft shoulder 178, and therefore by the cam shaft 132 against the cylindrical cam element 124. The increased force in the cylindrical cam element 124 is then transferred to the rotor 120 which applies pressure against the stator face 154, moving the valve 100 from a high pressure operation to an higher pressure operation.

Thus, in conjunction with the cam element stopping element 156, and the valve body cylindrical keyed passageway key 164 and the valve body cylindrical keyed passageway second key 166, the movement from the high pressure position to the single higher pressure arrangement is the interface between the cylindrical cam element 124 and the cam shaft 132. Thus, the cam shaft 132 is adapted to rotate beyond the valve body cylindrical keyed passageway key contacting position to a cylindrical cam element crest-cam shaft crest contacting position wherein each of the at least two cam shaft crests 276 is atop a corresponding cylindrical cam element crest 272. In this position, the spring 136 is maintained at a second height 298 where the second height 298 is less than the first height 196 and at least two of the ports 112 on the stator face 154 are in communication with at least one of the slots 194 on the rotor 120, providing operation of the valve 100 to permit flow from one input port 112 to an output port 112 at the single higher pressure without movement of the rotor 120 at the single higher pressure.

To facilitate the change from an higher pressure operation as illustrated in FIG. 2 back to the high pressure operation of FIG. 1A, the cam shaft 132 is further rotated, causing the previously contacting crests 272, 276 to slide back into the associated troughs 286, 288. Thus, the cam shaft 132 is adapted to rotate beyond the cylindrical cam element crest-cam shaft crest contacting position to a cylindrical cam element crest-cam shaft trough contacting position, which includes the initial position, wherein each of the at least two cam shaft crests 276 is atop a corresponding cylindrical cam element trough 286 and the cam shaft 132 and cylindrical cam element 124 may be counter-rotated. Because the rotor 120 remains in position while the cam shaft 132 is rotated and re-engages the cylindrical cam element 124, there is no change in position and therefore there is no wear between the rotor 120 and the stator face 154 in the higher pressure operation.

Figure 3:
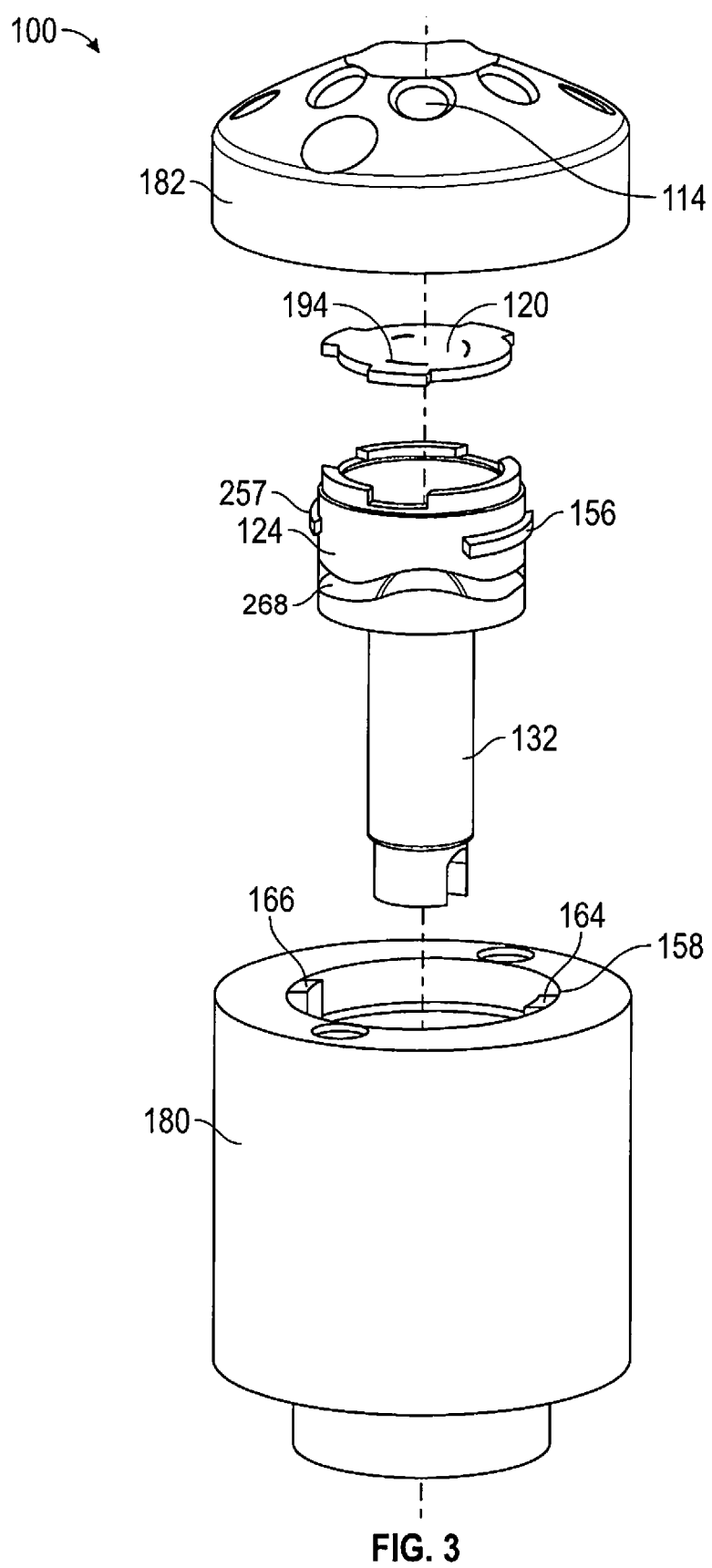
FIG. 3 is an illustration of an exploded view of certain parts of the valve.

Thus, the cam shaft 132 is adapted to position and to rotate the cylindrical cam element 124 and to provide a force to the cylindrical cam element 124 and a single high pressure from the rotor 120 against the stator face 154 in the absence of resistance to rotation of the cylindrical cam element stopping element 156 by the valve body cylindrical keyed passageway key 164. Moreover, the cam shaft 132 is adapted to rotate relative to the cylindrical cam element 124 and to provide an increased force to the cylindrical cam element 124 and the single higher pressure from the rotor 120 against the stator face 154 while the cylindrical cam element stopping element 156 is in contact with the valve body cylindrical keyed passageway key 164 and the cam shaft 132 is rotated such that each of the least two cam shaft crests 276 are not positioned in one of the cylindrical cam element troughs 286. This is possible as the cylindrical cam element 124 is adapted to rotate relative to the valve body 140 absent contact between the cylindrical cam element stopping element 156 and the valve body cylindrical keyed passageway key 164 and adapted to be rotationally stationary relative to the valve body 140 while the cylindrical cam element stopping element 156 contacts the valve body cylindrical keyed passageway key 164 and the cam shaft 132 is rotated such that each of the least two cam shaft crests 276 are not positioned in one of the cylindrical cam element troughs 286; and Referring to FIG. 3, an exploded view of certain parts of the valve 100 is provided. FIG. 3 illustrates the valve body upper section 182 and the valve body lower section 180, which provides the keyed passageway 158, the keyed passageway key 164, the keyed passageway second key 166, and through which is positioned the cam shaft 132. Intermediate these two are the rotor 120 affixed to the cylindrical cam element 124, which cylindrical cam element 124 rests on the cam shaft 132 such that the cam shaft crests 276 and the cylindrical cam element crests 272 are resting in the corresponding trough 286, 288. The stopping element 156 and the cylindrical cam element second stopping element 257 are positioned on the outside of the cylindrical cam element 124 and interact with the keyed passageway on the body lower section 180.

With this structure, the increased pressure after the stopping element 156 has engaged provides for increased performance. In general, at the beginning of a chromatographic analysis using the valve 100 of the present disclosure with a sample loop and either a chromatographic column or precolumn, the rotor 120 is moved to a higher pressure injection position. After the sample loop is loaded into the column, typically by use of a 6 port sample valve, or into a precolumn, typically by use of a 10 port sample valve, the valve 100 is returned to the high pressure load position before the cam cylindrical element 124 is engaged.

In operation, the valve 100 may be cycled through four steps illustrated in FIG. 4A-4D, which provides a top-down view along cut line 5-5. The valve 100 depicted in FIG. 4A-4D is an example of an eight port external sample injector structure where the cylindrical cam element 124 includes four cylindrical cam element crests 276 and the cam shaft 132 likewise includes four cylindrical cam element crests 272. As can be appreciated, more or fewer crests can be included on the cam shaft 132 and the cylindrical cam element 124, but which requires alteration of the extent of rotation. In each case, the rotation of the cam shaft 132 relative to the cylindrical cam element 124 when moving from one pressure regime to the other is the quotient of 360 divided by twice the number of crests.

Figure 4A:
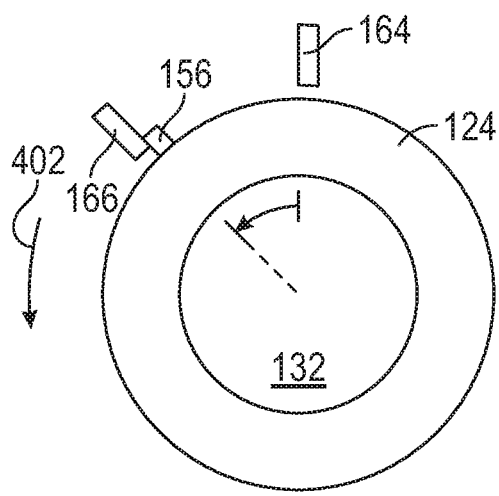
FIG. 4A is a top-down illustration of the first of four steps for use of one example of the valve when four crests are provided on each of the cam shaft and cylindrical cam shaft element, illustrating a change from high pressure inject to high pressure load.
Figure 4B:
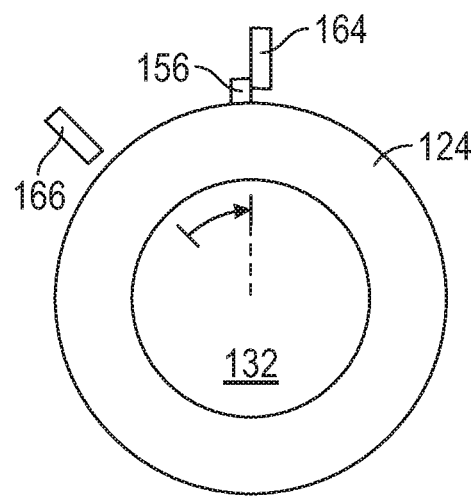
FIG. 4B is a top-down illustration of the second of the four steps for use of one example of the valve when four crests are provided on each of the cam shaft and cylindrical cam shaft element, illustrating a change from high pressure load to high pressure inject.
Figure 4C:
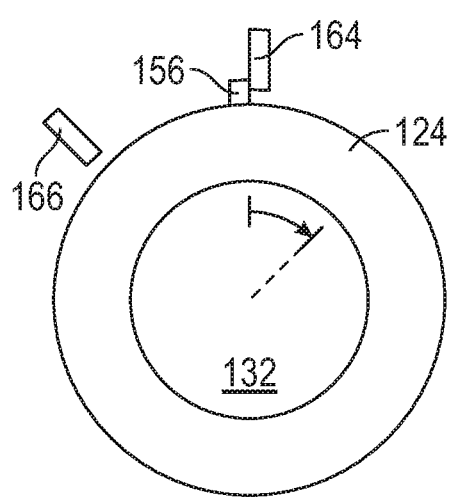
FIG. 4C is a top-down illustration of the third of the four steps for use of one example of the valve when four crests are provided on each of the cam shaft and cylindrical cam shaft element, illustrating the change from high pressure inject to higher pressure inject.
Figure 4D:
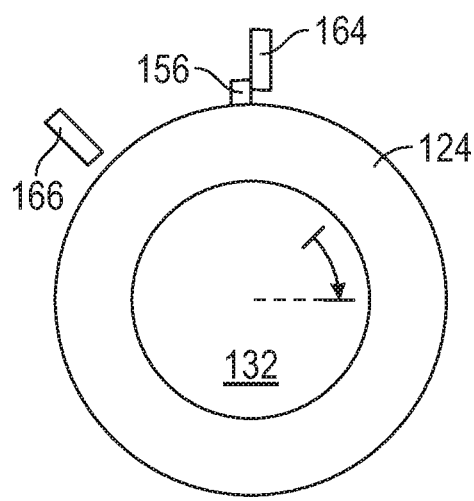
FIG. 4D is a top-down illustration of the fourth of the four steps for use of one example of the valve when four crests are provided on each of the cam shaft and cylindrical cam shaft element, illustrating the change from higher pressure inject to high pressure inject.

FIG. 4A is an illustration of the first of the four steps for use of the valve, illustrating the change from the high pressure inject position to an high pressure load position while FIG. 4B is an illustration of the second of the four steps for use of the valve, illustrating the change from the high pressure load position to high pressure inject position. FIG. 4C is an illustration of the third of the four steps for use of the valve, illustrating the change from high pressure inject position to a higher pressure inject position while FIG. 4D is an illustration of the fourth of the four steps for use of the valve, illustrating the change from a higher pressure inject position to the high pressure inject position. Conversely, the inject positions may be instead be used as loading positions and the load positions may be used as inject positions.

In the step illustrated in FIG. 4A and looking downward from cut line 5-5, the cam shaft 132 is rotated in one direction, such as forty-five degrees counterclockwise, i.e. in a first direction 402, from a position for high pressure inject to a position for high pressure load. This is a movement of the cam shaft 132 and the cylindrical cam element 124 from the valve body cylindrical passage key 164 to the valve body cylindrical passage second key 166, so no increased pressure is introduced and therefore the contact and wear between the rotor and stator is at the single high pressure. This is a positioning from a load position to an inject position, each at the single high pressure. The cylindrical cam element 124 and the cam shaft 132 are rotated together forty-five degrees counterclockwise, from the valve body cylindrical passage key 164, which functions as the load sample stop, to the valve body cylindrical passage second key 166, which functions as the inject sample stop. Notably, the valve 100 operates at the same high pressure while in the position for high pressure load, while rotating from the position for high pressure load to the position for high pressure inject, and in the position for high pressure inject. In the position for high pressure load and in the position for high pressure inject, the valve 100 is in operation and the rotor 120 and the stator face 154 are stationary with respect to one another.

In the step illustrated in FIG. 4B, the cam shaft 132 is counter-rotated, such as forty-five degrees clockwise, returning it to the original position associated with the first step in FIG. 4A, from a high pressure load position to the high pressure inject position, again with both positions at high pressure. Here the rotor 120 is moving relative to the stator face 154. This is a movement of the cylindrical cam element 124 and the cam shaft 132 only from the valve body cylindrical passage second key 166 to the valve body cylindrical passage key 164. Again, contact and wear between the rotor and stator is at the single high pressure. Notably, the valve 100 operates at the same high pressure in both positions and while rotating therebetween.

In the step illustrated in FIG. 4C, the cam shaft 132 is again rotated clockwise, such as a further forty-five degrees, however, this is a rotation only of the cam shaft 132, with no rotation of the rotor 120, thus moving the valve 100 from a high pressure inject position, such as illustrated in FIG. 1B, to a higher pressure inject position, such as illustrated in FIG. 2, where movement between the cylindrical cam element crests 272 and the cam shaft crests 276 occurs and causes the operating pressure to increase. Here, the rotor 120 is not moving relative to the stator face 154; each remains fixed in position to the other. While providing operation at higher pressure, no higher pressure wear of the rotor 120 and stator face 154 is incurred. While the cylindrical cam element 124 remains stationary, the cam shaft 132 is rotated forty-five degrees clockwise so the cylindrical cam element crests 272 are positioned atop cam shaft crests 276. Thus, while the valve 100 was at high pressure for the high pressure load position while the rotor 120 and the stator face 154 were stationary with respect to one another, the valve 100 also operates at higher pressure for the higher pressure load position while the rotor 120 and the stator face 154 are stationary with respect to one another.

In the step illustrated in FIG. 4D, the cam shaft 132 is rotated again, such as a further forty-five degrees clockwise. Here the rotor 120 is not moving relative to the stator face 154; each remains fixed in position to the other. The valve 100 is moved from the higher pressure inject position, such as illustrated in FIG. 2, to the high pressure inject position through, such as illustrated in FIG. 1A, where movement between the cylindrical cam element crests 272 and the cam shaft crests 276 occurs so the crests settle back into the corresponding trough and cause the operating pressure to decrease. The home position, illustrated in FIG. 4A, is thus advanced 90 degrees each time. No higher pressure wear of the rotor 120 and stator face 154 is incurred. While the cylindrical cam element 124 remains stationary, the cam shaft 132 is rotated a further forty-five degrees clockwise so the cylindrical cam element crests 272 are positioned laterally adjacent the cam shaft crests 276, reducing operation from the maximum pressure through the lower pressures to a single high pressure.

Alternatively, in operation, a valve 100, where each of the cylindrical cam element 124 includes three cylindrical cam element crests 276 and the cam shaft 132 likewise includes three cylindrical cam element crests 272 may be cycled through five steps, a first position, a second position, a third position, a fourth position, and a fifth position, as illustrated in FIGS. 5A-5E, 6A-6E, and 7A-7E. Moving from one pressure regime to another is therefore accomplished when the cam shaft 132 is rotated sixty degrees relative to the cylindrical cam element 124. This is particularly appropriate where a sample is to be carried at higher pressure, such as ultra-high pressure, through a system with a carrier at the single higher pressure. The valve 100 in FIGS. 5A-5E, 6A-6E, and 7A-7E may be a six port valve. FIGS. 5A-5E provide an upward view from plane 5-5 of the cylindrical cam element 124 within the valve body cylindrical keyed passageway 158 through five positions A-E, where the valve 100 has three cylindrical cam element crests 272 and the cam shaft crests 276. FIGS. 6A-6E provide a side view of the cylindrical cam element 124 and the cam shaft 132 through the five positions A-E. FIGS. 7A-7E provide an upward view from plane 7-7 of the cam shaft 132 within the valve 100 through the five positions A-E, and therefore all rotations are inverted, i.e. clockwise becomes counterclockwise from FIG. 5A-5E.

Figure 5A:
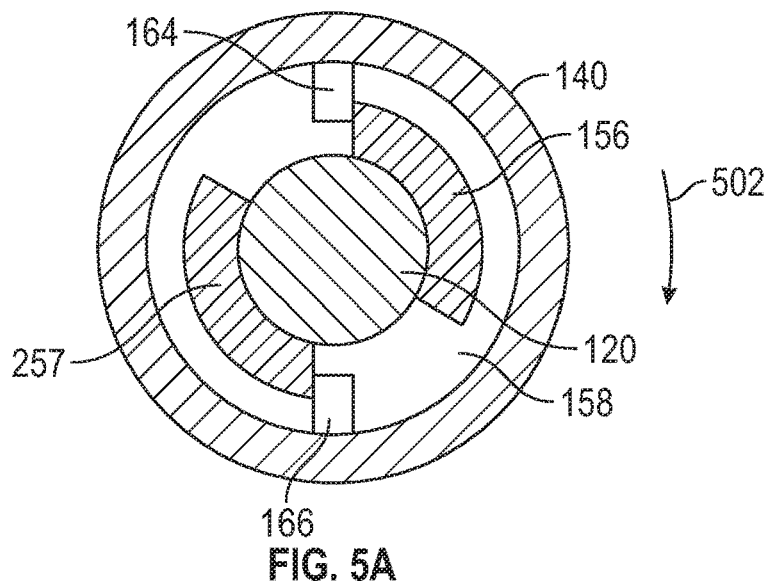
FIG. 5A is an upward view from plane 5-5 of an example of the cylindrical cam element within the valve body cylindrical keyed passageway in a first position when three crests are provided on each of the cam shaft and cylindrical cam shaft element.
Figure 6A:
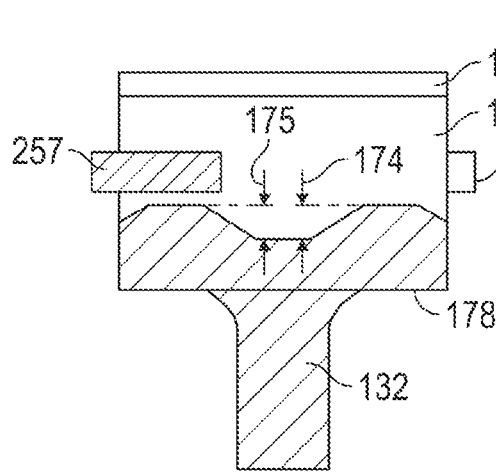
FIG. 6A is a side view of the cylindrical cam element and the cam shaft in the first position illustrated in FIG. 5A.
Figure 7A:
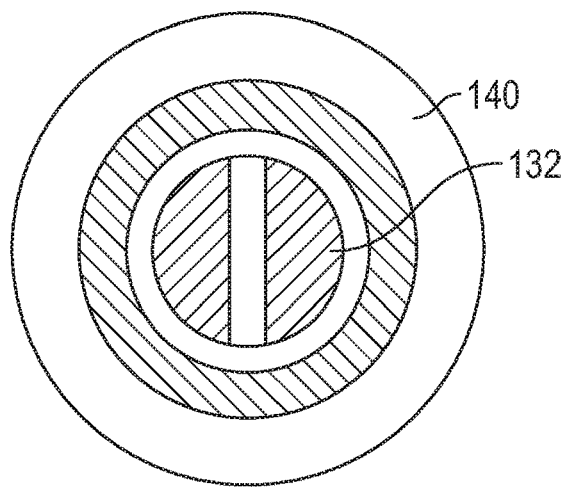
FIG. 7A is upward view from plane 7-7 of the cam shaft and valve body in the first position illustrated in FIG. 5A.

In the first position, illustrated in FIGS. 5A, 6A and 7A, the valve 100 is prepared for use where the cylindrical cam element 124 is mated to the cam shaft 132 in the high pressure position, such that the cylindrical cam element crests 272 and the cam shaft crests 276 are each in a corresponding trough and the cylindrical cam element stopping element 156 is adjacent the valve body cylindrical keyed passageway key 164, the three cam shaft crests 276 are laterally adjacent the three cylindrical cam element crests 272, and the spring 136 is maintained at a first height 196 providing a high pressure interface between the rotor 120 and the stator face 154, with the high pressure interface being at a single pressure. The single high pressure is set at a desirable level, such as not in excess of 7,000 psi. Lower pressures, as low at 1,000 psi, for example, may be used. This first position is a high pressure inject position. The stator face 154 thus is in contact with the rotor 120 at a single high pressure in this first position. No higher pressure wear of the rotor 120 and stator face 154 is incurred in this first position. This is particularly beneficial where the single higher pressure is within the ultra-high pressure regime for liquid chromatography.

Figure 5B:
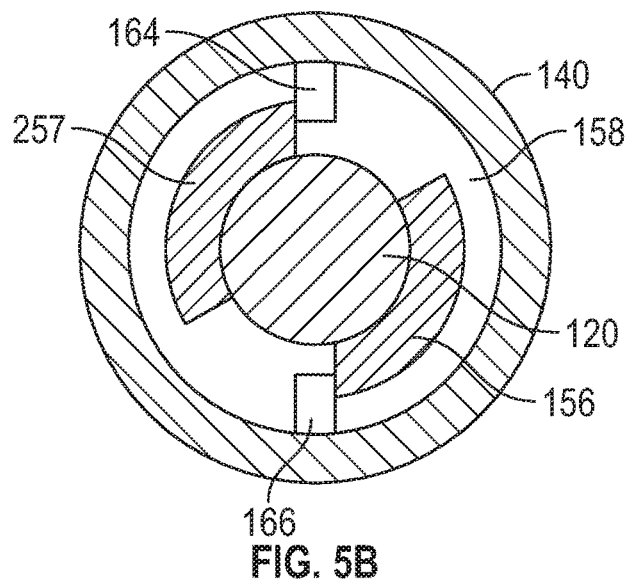
FIG. 5B is an upward view from plane 5-5 of an example of the cylindrical cam element within the valve body cylindrical keyed passageway in a second position when three crests are provided on each of the cam shaft and cylindrical cam shaft element for the valve illustrated in FIG. 5A.
Figure 6B:
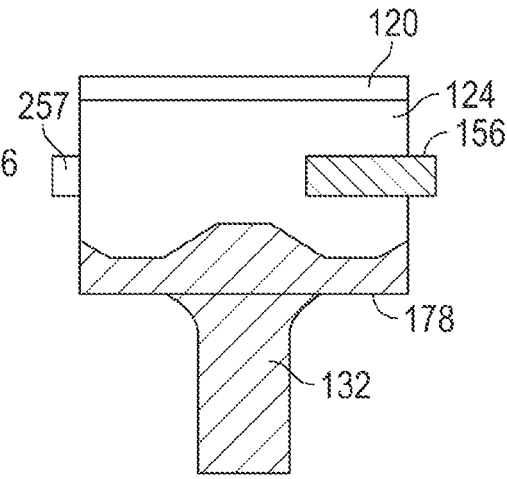
FIG. 6B is a side view of the cylindrical cam element and the cam shaft in the second position illustrated in FIG. 5B.
Figure 7B:
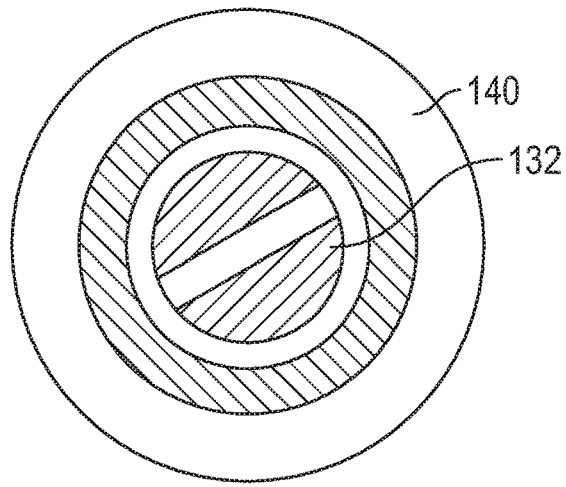
FIG. 7B is upward view from plane 7-7 of the cam shaft and valve body in the second position illustrated in FIG. 5B.

In the second position, illustrated in FIGS. 5B, 6B and 7B, the valve 100 is positioned for injection where the cam shaft 132 is rotated until the cylindrical cam element stopping element 156 is adjacent a valve body cylindrical keyed passageway second key 166. The cylindrical cam element 124 remains mated to the cam shaft 132 at the single high pressure. This may be a rotation of sixty (60) degrees clockwise, i.e., in a first direction 502. In this second position, the three cam shaft crests 276 are laterally adjacent the three cylindrical cam element crests 272 and the spring 136 is maintained at the first height 196. This provides a load position at the single high pressure for loading of the valve 100. The stator face 154 contacts the rotor 120 at the single high pressure in the second position, and the stator face 154 contacts the rotor 120 at the single high pressure during the clockwise rotation of the rotor 120 and the cylindrical cam element 124 from the first position to the second position and in the second position. While the valve 100 has been repositioned, no higher pressure wear of the rotor 120 and stator face 154 is incurred.

Figure 5C:
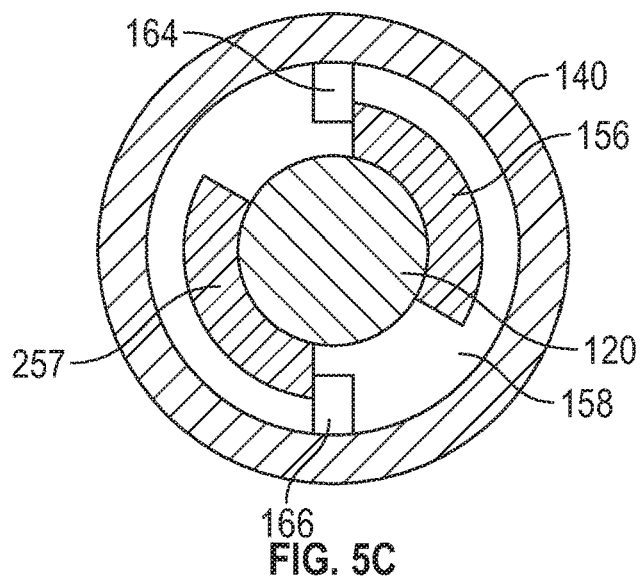
FIG. 5C is an upward view from plane 5-5 of an example of the cylindrical cam element within the valve body cylindrical keyed passageway in a third position when three crests are provided on each of the cam shaft and cylindrical cam shaft element for the valve illustrated in FIG. 5A.
Figure 6C:
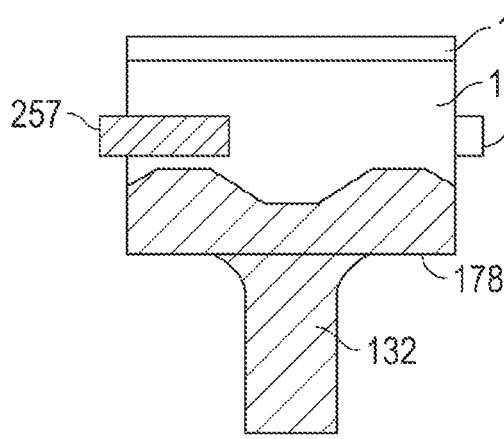
FIG. 6C is a side view of the cylindrical cam element and the cam shaft in the third position illustrated in FIG. 5C.
Figure 7C:
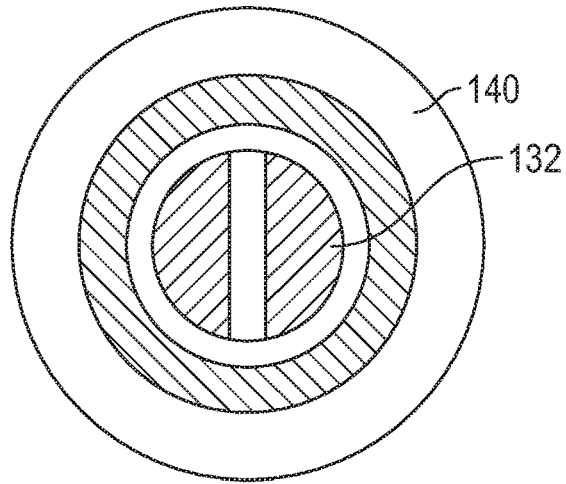
FIG. 7C is upward view from plane 7-7 of the cam shaft and valve body in the third position illustrated in FIG. 5C.

In the third position, illustrated in FIGS. 5C, 6C and 7C, the cam shaft 132 is rotated back to the position associated with the first position in anticipation of higher pressure injection, so the cylindrical cam element stopping element 156 contacts and is adjacent the first valve body cylindrical keyed passageway key 164. The cylindrical cam element 124 remains mated to the cam shaft 132. This may be a sixty (60) degrees counterclockwise rotation. The three cam shaft crests 276 are laterally adjacent the three cylindrical cam element crests 272, and the spring 136 is maintained at the first height 196, providing the high pressure interface between the rotor 120 and the stator face 154. The stator face 154 contacts the rotor 120 at the single high pressure in the third position, and the stator face 154 and contacts the rotor 120 at the single high pressure during the counterclockwise rotation of the cam shaft 132 and the cylindrical cam element 124 from the second position to the third position. Since no movement is made of the rotor 120 relative to the stator face 154 in this repositioning, no higher pressure wear of the rotor 120 and stator face 154 is incurred. Further counterclockwise rotation of the cam shaft 132 will not produce further rotation of the rotor 120 and will instead cause the cam shaft 132 to rotate relative to the cylindrical cam element 124, causing the cam shaft 132 to be driven outwards while the cam shaft crests 276 climb the cylindrical cam element crests 272 from the associated troughs.

Figure 5D:
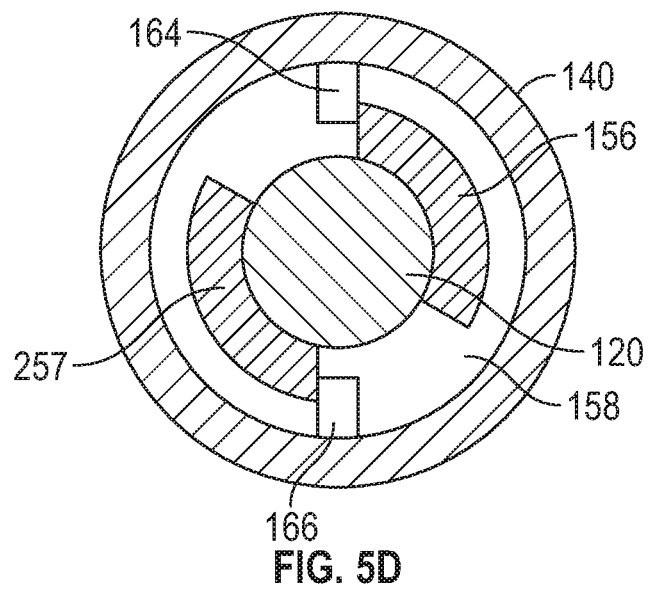
FIG. 5D is an upward view from plane 5-5 of the cylindrical cam element within the valve body cylindrical keyed passageway in a fourth position when three crests are provided on each of the cam shaft and cylindrical cam shaft element for the valve illustrated in FIG. 5A.
Figure 6D:
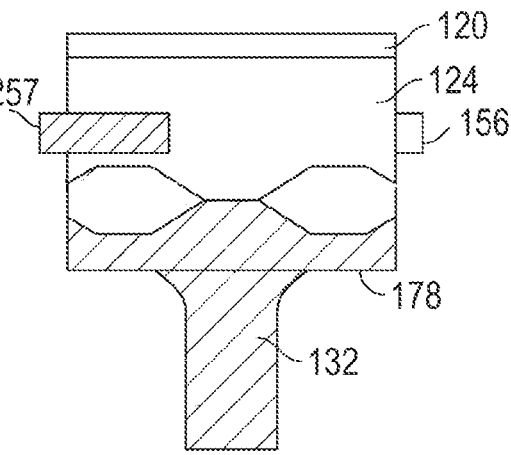
FIG. 6D is a side view of the cylindrical cam element and the cam shaft in the fourth position illustrated in FIG. 5D.
Figure 7D:
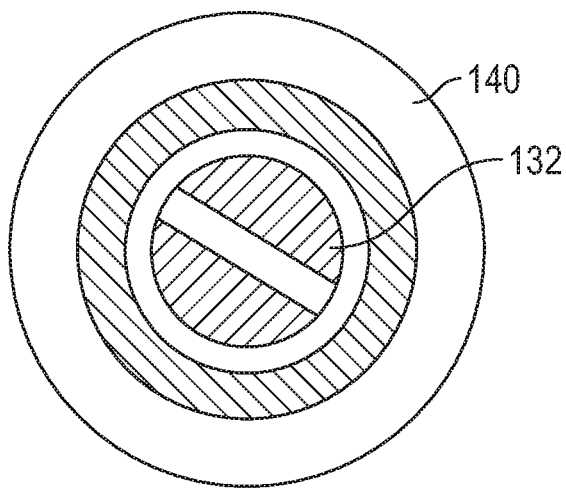
FIG. 7D is upward view from plane 7-7 of the cam shaft and valve body in the fourth position illustrated in FIG. 5D.

In the fourth position, illustrated in FIGS. 5D, 6D and 7D, the cam shaft 132 is rotated until the cylindrical cam element crests 272 are atop the cam shaft crests 276 for an higher pressure load position. As the cylindrical cam element stopping element 156 was already in contact with the first valve body cylindrical keyed passageway key 164 in the third position, the further counterclockwise rotation causes the cam shaft 132 to rotate separately from the cylindrical cam element 124 and therefore cause the cylindrical cam element crests 272 to climb the cam shaft crests 276 until positioned atop and in alignment and the rotor 120 to apply increased force to the cylindrical cam element 124 and thereby to the rotor 120 which applies force against the stator face 154 in response to the biasing of the spring 136 between the cam shaft shoulder 178 and the valve body internal cylinder shoulder 134. In the fourth position, the cylindrical cam element stopping element 156 is adjacent the valve body cylindrical keyed passageway key 164, the three cam shaft crests 276 are atop the three cylindrical cam element crests 272, and the spring 136 is maintained at the second height 298. Where three cylindrical cam element crests 272 are present, this is a sixty (60) degree counterclockwise rotation. Where four cylindrical cam element crests 272 are present this is a forty-five (45) degree counterclockwise rotation.

Between the third and the fourth positions, the change in height of the spring 136 from the first height 196 to the second height 298 provides the higher pressure interface between the rotor 120 and the stator face 154, the higher pressure interface at a single pressure higher than the single high pressure. While the single high pressure may be relatively high, such as in excess of 15,000 psi, any pressure above the single high pressure may be selected. Beneficially, no movement of the rotor 120 occurs during that transition. The stator face 154 thus contacts the rotor 120 at a single higher pressure in the fourth position, and contacts the rotor 120 from the single high pressure to the single higher pressure during the counterclockwise rotation of the cam shaft 132 from the third position to the fourth position. While the valve 100 has been repositioned, no higher pressure wear of the rotor 120 and stator face 154 is incurred.

Figure 5E:
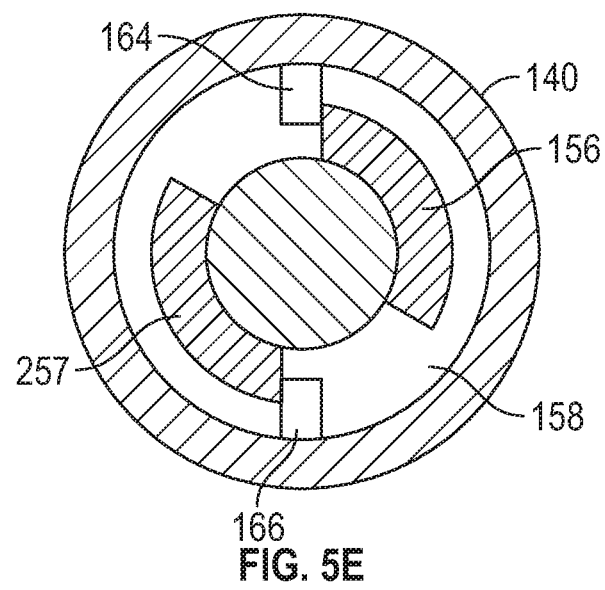
FIG. 5E is an upward view from plane 5-5 of the cylindrical cam element within the valve body cylindrical keyed passageway in a fifth position when three crests are provided on each of the cam shaft and cylindrical cam shaft element for the valve illustrated in FIG. 5A.
Figure 6E:
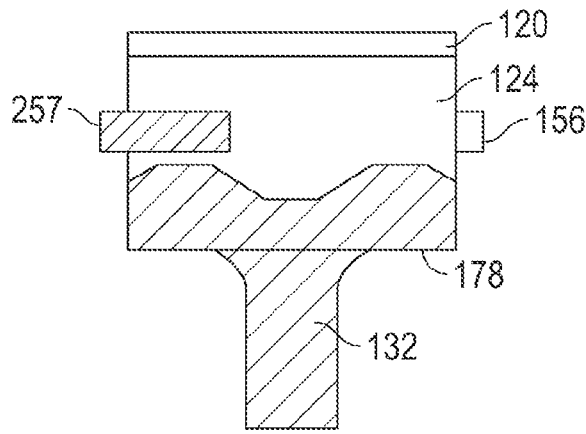
FIG. 6E is a side view of the cylindrical cam element and the cam shaft in the fifth position illustrated in FIG. 5E.
Figure 7E:
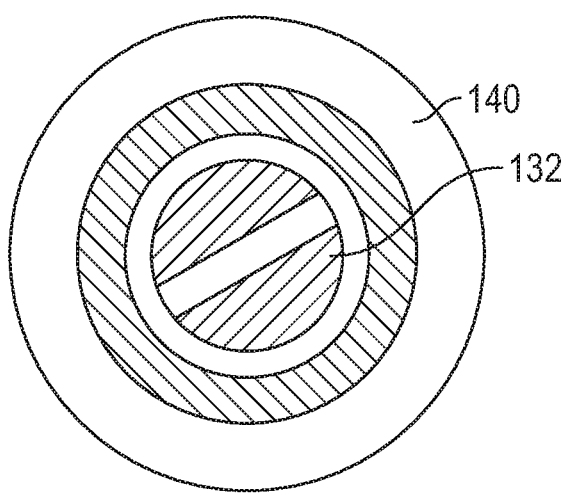
FIG. 7E is upward view from plane 7-7 of the cam shaft and valve body in the fifth position illustrated in FIG. 5E.

In the fifth position, illustrated in FIGS. 5E, 6E and 7E, the cam shaft 132 is rotated until the cylindrical cam element crests 272 and the cam shaft crests 276 are each in the next corresponding trough. The continued rotation of the cam shaft 132 counterclockwise is necessary as the cylindrical cam element 124 is maintained in position while the cam shaft 132 continues to rotate. In the fifth position, the cylindrical cam element stopping element 156 is adjacent the valve body cylindrical keyed passageway key 164 and the three cam shaft crests 276, and laterally adjacent the three cylindrical cam element crests 272, and the spring 136 is maintained at the first height 196, providing the high pressure interface between the rotor 120 and the stator face 154. The fifth position thus facilitates operation of the valve at the single high pressure. Where three cylindrical cam element crests 272 are present, this is a sixty (60) degree counterclockwise rotation.

Intermediate the fourth position and the fifth position, the direct change in height of the spring 136 from the second height 298 to the first height 196 provides the high pressure interface between the rotor 120 and the stator face 154. There is no varying of the height of the spring 136 while in the high pressure arrangement. Beneficially, no movement of the rotor 120 occurs during that transition, only after return to the single pressure associated with the high pressure arrangement.

The stator face 154 contacts the rotor 120 at the single high pressure in the fifth position, the stator face 154 contacts the rotor 120 from the single higher pressure to the single high pressure during the counterclockwise rotation of the cam shaft 132 from the fourth position to the fifth position. While the valve 100 has been repositioned, no higher pressure wear of the rotor 120 and stator face 154 is incurred.

Movement of the rotor 120 relative to the stator face 154, and therefore creation of friction and generation of wear, at higher pressures is avoided by the preclusion of motion of the rotor 120 and the associated cylindrical cam element 124 when entering or exiting the higher pressure interface. The rotation of the cylindrical cam element 124 is arrested due to contact of cylindrical cam element stopping element against a valve body cylindrical keyed passageway key while the cam shaft 132 is rotated. While the rotation of the cylindrical cam element 124 is arrested, the cam shaft crests 276 are drive atop and then past the cylindrical cam element crests 272, resulting in the change in operating pressure from the single high pressure generated by the spring 136 at the initial biasing to the single higher pressure generated by the spring 136 when deflected the lesser of the cam shaft crest height 175 and the cylindrical cam element crest height 174.

Notably, the user must note that after re-entering the high pressure operation, the position of the cam shaft 132 relative to the rotor 120 has advanced or receded by a factor relative to the number of crests uses. Where three crests are used, the result is an advance of 120 degrees occurs from high pressure through higher pressure and back to high pressure.

Figure 8:
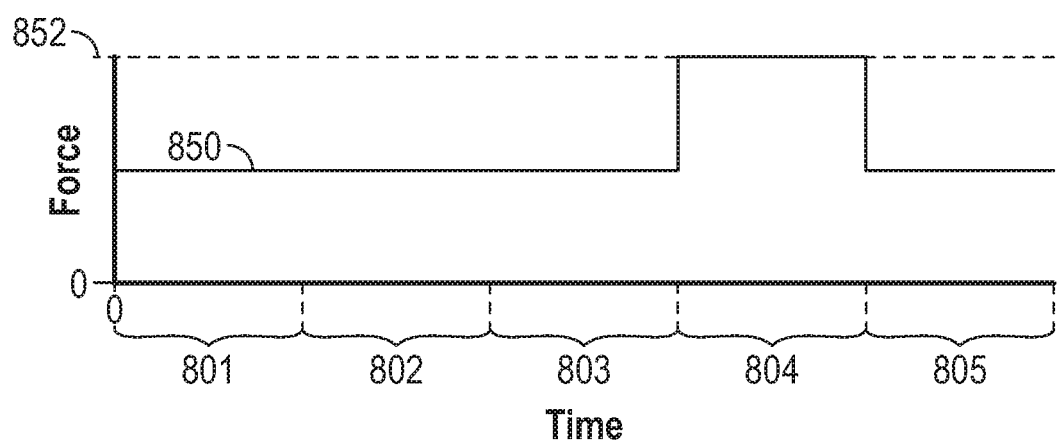
FIG. 8 is a graphical representation of pressure applied by the rotor 120 to the stator face 154 is shown in the binary selection between the high pressure arrangement and the higher pressure arrangement in connection with the five positions represented in FIG. 5A-7E.

Referring to FIG. 8, a graphical representation of pressure applied by the rotor 120 to the stator face 154 is shown in the binary selection between the high pressure arrangement and the higher pressure arrangement in connection with the five positions illustrated in FIG. 5A-7E is provided. In the first position 801, the rotor 120 and the cam shaft 132 are provided in the high pressure arrangement at the single high pressure 850 during operation. During movement from the first position 801 to the second position 802, the rotor 120 and the cam shaft 132 are rotated together in the high pressure arrangement at the single high pressure 850 at which the rotor 120 and the cam shaft 132 remain in the high pressure arrangement, avoiding any wear at high pressure of the rotor 120 against the stator face 154. In the second position 802, the rotor 120 and the cam shaft 132 remain in the high pressure arrangement. During movement from the second position 802 to the third position 803, the rotor 120 and the cam shaft 132 are counter-rotated together in the high pressure arrangement at the single high pressure 850 at which the rotor 120 and the cam shaft 132 remain in the high pressure arrangement, avoiding any wear at high pressure of the rotor 120 against the stator face 154. In the third position 803, the rotor 120 and the cam shaft 132 remain in the high pressure arrangement. During movement from the third position 803 to the fourth position 804, rotation of the rotor 120 is arrested while the cam shaft 132 is counter-rotated from the high pressure arrangement to the higher pressure arrangement, resulting is an immediate and direct transition from the high pressure 850 to the higher pressure 852 without movement of the rotor 120 and thus without any alteration in pressure during movement of the rotor 120. In the fourth position 804, the rotor 120 and the cam shaft 132 are in the higher pressure arrangement, avoiding any wear at high pressure of the rotor 120 against the stator face 154. In the fourth position 804, the rotor 120 and the cam shaft 132 remain in the higher pressure arrangement. During movement from the fourth position 804 to the fifth position 805, rotation of the rotor 120 continues to be arrested while the cam shaft 132 is further counter-rotated from the higher pressure arrangement to the high pressure arrangement, resulting is an immediate and direct transition from the higher pressure 852 to the high pressure 850 without movement of the rotor 120 and thus without any alteration in pressure during movement of the rotor 120. In the fifth position 805, the rotor 120 and the cam shaft 132 are in the high pressure arrangement, avoiding any wear at higher pressure of the rotor 120 against the stator face 154. In the fifth position 805, the rotor 120 and the cam shaft 132 are returned to the high pressure arrangement. Notably, in both the high pressure arrangement and the higher pressure arrangement, the applicable force is provided solely by the spring 136, which is maintained at a constant length associated with each arrangement, avoiding any ramping of pressure or higher pressure applied to the rotor 120 during any rotation of the rotor 120. No external force is applied to the spring 136 in either arrangement and the spring 136 provides both the high pressure 850 and the higher pressure 852.

As provided herein, such higher pressure may be at or above the minimum pressure for ultra-high liquid chromatography.

The terms and expressions which have been employed in the foregoing specification are used therein as terms of description and not of limitation, and there is no intention, in the use of such terms and expressions, of excluding equivalents of the features shown and described or portions thereof.

We claim:

1. A valve (100) for selectively communicating a fluid to an output port at a single high pressure in a high pressure arrangement or at a single higher pressure, the single higher pressure in excess of the single high pressure, comprising:
a valve body (140) having a stator face (154) with at least two ports (112) at a valve first end (150), each of the at least two ports (112) communicating with the stator face (154), the valve body (140) having a valve body internal cylindrical shoulder (134) at a valve second end (152), the valve body (140) having a valve body cylindrical keyed passageway (158), the valve body cylindrical keyed passageway (158) having a valve body cylindrical keyed passageway key (164);
a rotor (120) adjacent the stator face (154), the rotor (120) having at least one slot (194) adapted to be positioned for communication among two of the at least two ports (112);
a cylindrical cam element (124) affixed to the rotor (120) at a cylindrical cam element top surface (160), the cylindrical cam element (124) having a cylindrical cam element stopping element (156) affixed to a cylindrical cam element side (162), the cylindrical cam element stopping element (156) adapted to contact the valve body cylindrical keyed passage key (164), the cylindrical cam element (124) having a cylindrical cam element bottom face (161), the cylindrical cam element bottom face (161) having at least two cylindrical cam element crests (272) extended therefrom, a cylindrical cam element trough (286) intermediate each of the at least two cylindrical cam element crests (272), and a cylindrical cam element ramp (290) intermediate each of the at least two cylindrical cam element crests (272) and the laterally-adjacent cylindrical cam element trough (286), each of the at least two cylindrical cam element crests (272) having a cylindrical cam element crest height (174), the cylindrical cam element (124) having a wavelength (177) including one of the at least two cylindrical cam element crests (272), a cylindrical cam element trough (286) and two cylindrical cam element ramps (290), the cylindrical cam element (124) rotatable relative to the valve body (140);
a cam shaft (132) having a cam shaft face (268), the cam shaft face (268) having at least two cam shaft crests (276) extended therefrom, a cam shaft trough (288) intermediate each of the at least two cam shaft crests (276), and a cam shaft ramp (292) intermediate each of the at least two cam shaft crests (276) and the laterally-adjacent cam shaft trough (288), each of the cam shaft crests (276) having a cam shaft crest height (175), the cam shaft (132) having a cam shaft shoulder (178) near the cam shaft face (268), the cam shaft face (268) of the cam shaft (132) adjacent the cylindrical cam element bottom face (161) of the cylindrical cam element (124), wherein one of the at least two cam shaft crests (276), the cam shaft trough (288) and two of the cam shaft ramps (292) equal the wavelength (177); and a spring (136), the spring (136) encircling the cam shaft (132), the spring (136) surrounded by the valve body (140) and the cam shaft shoulder (178), the spring (136) not connected to the cylindrical cam element (124), the spring (136) contacting one of the group consisting of the valve body internal cylindrical shoulder (134) and a bearing (135) adjacent the valve body internal cylindrical shoulder (134), the spring (136) contacting one of the group consisting of the bearing (135) and the cam shaft shoulder (178), the spring (136) at a first height (196) in the high pressure arrangement, the high pressure arrangement operating at the single high pressure.

2. The valve of claim 1 wherein the valve has a higher pressure arrangement, the higher pressure arrangement operating at the single higher pressure;

the high pressure arrangement comprising each of the at least two cam shaft crests positioned in one of the cylindrical cam element troughs (286) and the spring (136) maintained at a first height (196), the spring (136) providing the entirety of the force in the high pressure arrangement to bias the rotor (120) against the stator face (154) and without application of any additional load applied on the spring (136);

the higher pressure arrangement comprising the cylindrical cam element stopping element (156) contacting the valve body cylindrical keyed passageway key (164) to arrest rotation of the cylindrical cam element (124) relative to the cam shaft (132) in a first direction (502) and each of the at least two cam shaft crests positioned atop one of the cylindrical cam element crests (272), the cam shaft (132) at a first deflection distant the rotor (120), the spring (136) maintained at a second height (298) wherein the first height (196) is greater than the second height (298) by the first deflection;

wherein the valve (100) is adapted to move from the high pressure arrangement to the higher pressure arrangement by rotation in the first direction (502) of the cam shaft (132) while the cylindrical cam element stopping element (156) contacts the valve body cylindrical keyed passageway key (164) and precludes rotation of the rotor (120) relative to the stator face (154); and wherein the valve is adapted to move from the higher pressure arrangement to high pressure arrangement by rotation in the first direction (502) of the cam shaft (132) while the cylindrical cam element stopping element (156) contacts the valve body cylindrical keyed passageway key (164) and precludes rotation of the rotor (120) relative to the stator face (154) until each of the at least two cam shaft crests is positioned in one of the cylindrical cam element troughs (286).

3. The valve (100) of claim 2 wherein the rotation of the cam shaft (132) in the first direction (502) while the cylindrical cam element stopping element (156) contacts the valve body cylindrical keyed passageway key (164) and precludes rotation of the rotor (120) relative to the stator face (154) effecting movement from the high pressure arrangement to the higher pressure arrangement is equal to the quotient of 360 divided by twice the number of the at least two cam shaft crests (276); and the rotation of the cam shaft (132) in the first direction (502) while the cylindrical cam element stopping element (156) contacts the valve body cylindrical keyed passageway key (164) and precludes rotation of the rotor (120) relative to the stator face (154) effecting movement from the higher pressure arrangement to the high pressure arrangement is equal to the quotient of 360 divided by twice the number of the at least two cam shaft crests (276).

4. The valve of claim 1 wherein the at least two cam shaft crests (276) comprises four cam shaft crests (276) and the at least two cylindrical cam element crests (272) comprises four cylindrical cam element crests (272); and the valve having a first position, a second position, a third position, a fourth position and a fifth position, the first position comprising the cylindrical cam element stopping element (156) adjacent the valve body cylindrical keyed passageway key (164) and the four cam shaft crests (276) laterally adjacent the four cylindrical cam element crests (272), and the spring (136) maintained at a first height (196) and providing a high pressure interface between the rotor (120) and the stator face (154), the high pressure interface at the single high pressure;

the second position comprising the cylindrical cam element stopping element (156) adjacent a valve body cylindrical keyed passageway second key (166) and the four cam shaft crests (276) laterally adjacent the four cylindrical cam element crests (272), and the spring (136) maintained at the first height (196), the second position being a forty-five degree rotation in a first direction of the cam shaft (132) and the cylindrical cam element (124) from the first position, the stator face (154) contacting the rotor (120) in the second position, the stator face (154) contacting the rotor (120) at the high pressure interface during the rotation in the first direction of the rotor (120) and the cylindrical cam element (124) from the first position to the second position and in the second position;

the third position comprising the cylindrical cam element stopping element (156) adjacent the valve body cylindrical keyed passageway key (164) and the four cam shaft crests (276) laterally adjacent the four cylindrical cam element crests (272), and the spring (136) maintained at the first height (196) and providing the high pressure interface between the rotor (120) and the stator face (154), the third position being a forty-five degree rotation opposite the first direction of the cam shaft (132) and the cylindrical cam element (124) from the second position, the third position configured to facilitate injection of the valve, the stator face (154) contacting the rotor (120) at the high pressure interface in the third position, the stator face (154) contacting the rotor (120) at the high pressure interface during the rotation opposite the first direction of the cam shaft (132) and the cylindrical cam element (124) from the second position to the third position and in the third position;

the fourth position comprising the cylindrical cam element stopping element (156) adjacent the valve body cylindrical keyed passageway key (164) and the four cam shaft crests (276) atop the four cylindrical cam element crests (272), and the spring (136) maintained at the second height (298) and providing a higher pressure interface between the rotor (120) and the stator face (154), the higher pressure interface at the single higher pressure;

the fourth position being a forty-five degree rotation opposite the first direction of the cam shaft (132) relative to the cylindrical cam element (124), the stator face (154) contacting the rotor (120) at the higher pressure interface in the fourth position; and in the fifth position, the cylindrical cam element stopping element (156) adjacent the valve body cylindrical keyed passageway key (164) and the four cam shaft crests (276) laterally adjacent the four cylindrical cam element crests (272), and the spring (136) maintained at the first height (196); and the fifth position being a further forty-five degree rotation opposite the first direction of the cam shaft (132) relative to the cylindrical cam element (124), the fifth position providing the high pressure interface between the rotor (120) and the stator face (154).

5. The valve (100) of claim 1, further comprising a valve body cylindrical keyed passageway second key (166) in the valve body cylindrical keyed passageway (158) and a cylindrical cam element second stopping element (257) positioned on the cylindrical cam element (124).

6. The valve of claim 1 wherein the at least two cam shaft crests (276) comprises three cam shaft crests (276) and the at least two cylindrical cam element crests (272) comprises three cylindrical cam element crests (272); and the valve having a first position, a second position, a third position, a fourth position and a fifth position, the first position comprising the cylindrical cam element stopping element (156) adjacent the valve body cylindrical keyed passageway key (164) and the three cam shaft crests (276) laterally adjacent the three cylindrical cam element crests (272), and the spring (136) maintained at a first height (196) and providing a high pressure interface between the rotor (120) and the stator face (154), the high pressure interface at the high pressure;

the second position comprising the cylindrical cam element stopping element (156) adjacent a valve body cylindrical keyed passageway second key (166) and the three cam shaft crests (276) laterally adjacent the three cylindrical cam element crests (272), and the spring (136) maintained at the first height (196), the second position being a rotation opposite a first direction of the cam shaft (132) and the cylindrical cam element (124) from the first position, the stator face (154) contacting the rotor (120) in the second position, the stator face (154) contacting the rotor (120) at the high pressure interface during the rotation opposite the first direction of the rotor (120) and the cylindrical cam element (124) from the first position to the second position and in the second position;

the third position comprising the cylindrical cam element stopping element (156) adjacent the valve body cylindrical keyed passageway key (164) and the three cam shaft crests (276) laterally adjacent the three cylindrical cam element crests (272), and the spring (136) maintained at the first height (196) and providing the high pressure interface between the rotor (120) and the stator face (154), the third position being a rotation in the first direction of the cam shaft (132) and the cylindrical cam element (124) from the second position, the third position configured to facilitate injection of the valve, the stator face (154) contacting the rotor (120) at the high pressure interface in the third position, the stator face (154) contacting the rotor (120) at the high pressure interface during the rotation in the first direction of the cam shaft (132) and the cylindrical cam element (124) from the second position to the third position and in the third position;

the fourth position comprising the cylindrical cam element stopping element (156) adjacent the valve body cylindrical keyed passageway key (164) and the three cam shaft crests (276) atop the three cylindrical cam element crests (272), and the spring (136) maintained at the second height (298) and providing a higher pressure interface between the rotor (120) and the stator face (154), the higher pressure interface at the high pressure;

the fourth position being a sixty degree rotation in the first direction of the cam shaft (132) relative to the cylindrical cam element (124), the stator face (154) contacting the rotor (120) at the higher pressure interface in the fourth position; and in the fifth position, the cylindrical cam element stopping element (156) adjacent the valve body cylindrical keyed passageway key (164) and the three cam shaft crests (276) laterally adjacent the three cylindrical cam element crests (272), and the spring (136) maintained at the first height (196);

the fifth position being a further sixty degree rotation in the first direction of the cam shaft (132) relative to the cylindrical cam element (124), the fifth position providing the high pressure interface between the rotor (120) and the stator face (154).

7. The valve (100) of claim 1 wherein the at least two cam shaft crests (276) nest into the at least two cylindrical cam element troughs (286).

8. A valve (100), comprising:

a valve body (140) having an internal stator face (154) with two ports (112) at a valve first end (150), each of the two ports (112) associated with a fitting detail (114), each of the two ports (112) terminating at the stator face (154), the valve body (140) having a valve body internal cylindrical shoulder (134) at a valve second end (152), the valve body (140) having a valve body cylindrical keyed passageway (158), the valve body cylindrical keyed passageway (158) having a valve body cylindrical keyed passageway key (164) and a valve body cylindrical keyed passageway second key (166);

a rotor (120) adjacent the stator face (154);

a cylindrical cam element (124) affixed to the rotor (120) at a cylindrical cam element top surface (160), the cylindrical cam element (124) having a cylindrical cam element stopping element (156) affixed to a cylindrical cam element side (162), the cylindrical cam element stopping element (156) adapted to contact the valve body cylindrical keyed passageway key (164);

the cylindrical cam element stopping element (156) adapted to contact the valve body cylindrical keyed passageway second key (166), the cylindrical cam element (124) having a cylindrical cam element bottom face (161), the cylindrical cam element bottom face (161) having four cylindrical cam element crests (272) extended therefrom, each of the four cylindrical cam element crests (272) having a cylindrical cam element crest height (174) the cylindrical cam element (124) having a wavelength (177) including one of the four cylindrical cam element crests (272), a cylindrical cam element trough (286) and two cylindrical cam element ramps (290);

a cam shaft (132) having a shaft face (268), the cam shaft face (268) having four cam shaft crests (276) extended therefrom, each of the four cam shaft crests (276) having a cylindrical cam shaft crest height (175), the cam shaft (132) having a cam shaft shoulder (178) near the cam shaft face (268), the cam shaft face (268) of the cam shaft (132) adjacent the cylindrical cam element bottom face (161) of the cylindrical cam element (124), wherein one of the four cam shaft crests (276), the cam shaft trough (288) and two of the cam shaft ramps (292) equal the wavelength (177);

the cam shaft (132) rotatable with and relative to the cylindrical cam element (124), the cam shaft (132) configured to compress the spring (136) the lesser of the cam shaft crest height (175) and the cylindrical cam element crest height (174) when the cylindrical cam element stopping element (156) contacts the valve body cylindrical keyed passageway second key (166) and each of the four cam shaft crests (276) is displaced to a position atop a cylindrical cam element crest (272); and a spring (136), the spring (136) encircling the cam shaft (132), the spring (136) surrounded by the valve body (140) and the cam shaft shoulder (178), the spring (136) not connected to the cylindrical cam element (124), the spring (136) retained intermediate the valve body internal cylindrical shoulder (134) and the cam shaft shoulder (178), the spring (136) providing the entirety of the force in a high pressure arrangement to bias the rotor (120) against the stator face (154) and without application of any additional load applied on the spring (136), the spring (136) at a first height (196) in the high pressure arrangement.

9. The valve of claim 8,
wherein the valve has a higher pressure arrangement;
wherein the high pressure arrangement comprises each of the four cam shaft crests positioned in one of the cylindrical cam element troughs (286) and the spring (136) maintained at a first height (196), the spring (136) providing the entirety of the force in the high pressure arrangement to bias the rotor (120) against the stator face (154) and without application of any additional load applied on the spring (136), the high pressure arrangement operating at a single high pressure, the higher pressure arrangement operating at a second single pressure;
wherein the higher pressure arrangement comprises the cylindrical cam element stopping element (156) contacting the valve body cylindrical keyed passageway key (164) to arrest rotation of the cylindrical cam element (124) relative to the cam shaft (132) in a first direction (502) and each of the four cam shaft crests positioned atop one of the cylindrical cam element crests (272), the cam shaft (132) at a first deflection distant the rotor (120), the spring (136) maintained at a second height (298) wherein the first height (196) is greater than the second height (298) by the first deflection;
wherein the valve (100) is adapted to move from high pressure arrangement to the higher pressure arrangement by rotation in the first direction (502) of the cam shaft (132) while the cylindrical cam element stopping element (156) contacts the valve body cylindrical keyed passageway key (164) and precludes rotation of the rotor (120) relative to the stator face (154); and
wherein the valve is adapted to move from the higher pressure arrangement to the high pressure arrangement by rotation in the first direction (502) of the cam shaft (132) while the cylindrical cam element stopping element (156) contacts the valve body cylindrical keyed passageway key (164) and precludes rotation of the rotor (120) relative to the stator face (154) until each of the four cam shaft crests is positioned in one of the cylindrical cam element troughs (286).

10. A valve, comprising:
a valve body (140) having an internal stator face (154) with two ports (112) at a valve first end (150), each of the two ports (112) associated with a fitting detail (114), each of the two ports (112) terminating at the stator face (154), the valve body (140) having a valve body internal cylindrical shoulder (134) at a valve second end (152), the valve body (140) having a valve body cylindrical keyed passageway (158), the valve body cylindrical keyed passageway (158) having a valve body cylindrical keyed passageway key (164) and a valve body cylindrical keyed passageway second key (166);
a rotor (120) adjacent the stator face (154);
a cylindrical cam element (124) affixed to the rotor (120) at a cylindrical cam element top surface (160), the cylindrical cam element (124) having a cylindrical cam element stopping element (156) affixed to a cylindrical cam element side (162), the cylindrical cam element having a cylindrical cam element bottom face (161), the cylindrical cam element bottom face (161) having at least two cylindrical cam element crests (272) extended therefrom, a cylindrical cam element trough (286) intermediate each of the at least two cylindrical cam element crests (272), and a cylindrical cam element ramp (290) intermediate each of the at least two cylindrical cam element crests (272) and the laterally-adjacent cylindrical cam element trough (286), each cylindrical cam element crest (272) having a cylindrical cam element crest height (174), the cylindrical cam element (124) having a wavelength (177) including one of the at least two cylindrical cam element crests (272), a cylindrical cam element trough (286) and two cylindrical cam element ramps (290), the cylindrical cam element (124) rotatable relative to the valve body (140);
a cam shaft (132) having a cam shaft face (268), the cam shaft face (268) having at least two cam shaft crests (276) extended therefrom, a cam shaft trough (288) intermediate each of the at least two cam shaft crests (276), and a cam shaft ramp (292) intermediate each of the at least two cam shaft crests (276) and the laterally-adjacent adjacent cam shaft trough (288), each of the cam shaft crests (276) having cam shaft crest height (174), the cam shaft (132) having a cam shaft shoulder (178) near the cam shaft face (268), the cam shaft face (268) of the cam shaft (132) adjacent the cylindrical cam element bottom face (161) of the cylindrical cam element (124), wherein one of the at least two cam shaft crests (276), the cam shaft trough (288) and two of the cam shaft ramps (292) equal the wavelength (177);
a spring (136), the spring (136) encircling the cam shaft (132) and surrounded by the valve body (140) and the cam shaft shoulder (178), the spring (136) not connected to the cylindrical cam element (124), the spring (136) retained intermediate the valve body internal cylindrical shoulder (134) and the cam shaft shoulder (178);
the valve having a first position, a second position, a third position, a fourth position, and a fifth position, wherein
the first position comprising the stator face (154) contacting the rotor (120) at a single high pressure, the single high pressure being a single pressure, the spring (136) providing the entirety of the force for the single high pressure to bias the rotor (120) against the stator face (154) and without application of any additional load applied on the spring (136), the spring (136) at a first height (196) in the first position;

the second position comprising the cylindrical cam element stopping element (156) contacting the valve body cylindrical keyed passageway second key (166), the stator face (154) contacting the rotor (120) at the single high pressure during the rotation of the cam shaft (132) from the first position to the second position, the second position at a rotation in a first direction (502) from the first position of the cam shaft (132) and the cylindrical cam element (124), the spring (136) at the first height (196) in the second position;

the third position comprising the cylindrical cam element stopping element (156) contacting the valve body cylindrical keyed passageway second key (166), the stator face (154) contacting the rotor (120) at the single high pressure, the at least two cam shaft crests (276) laterally adjacent the at least two cylindrical cam element crests (272), the third position at a rotation counter to the first direction (502) of the cam shaft (132) and the cylindrical cam element (124), the stator face (154) contacting the rotor (120) at the single high pressure during the rotation of the cam shaft (132) from the second position to the third position, the spring (136) at the first height (196) in the third position;

the fourth position comprising the cylindrical cam element stopping element (156) contacting the valve body cylindrical keyed passageway key (164), the stator face (154) contacting the rotor (120) at a single higher pressure, the single higher pressure being in excess of the single high pressure, the at least two shaft crests (276) atop the at least two cylindrical cam element crests (272), the fourth position at a further rotation counter to the first direction (502) of the cam shaft (132), the stator face (154) contacting the rotor (120) at pressures transitioning from the single high pressure to the single higher pressure during the rotation of the cam shaft (132) from the third position to the fourth position, the rotor (120) fixed in positon during the rotation of the cam shaft (132) from the third position to the fourth position, the spring (136) at a second height in the fourth position, the second height (298) less than the first height (196); and the fifth position comprising the cylindrical cam element stopping element (156) contacting the valve body cylindrical keyed passageway key (164), the stator face (154) contacting the rotor (120) at the single high pressure, the at least two shaft crests laterally adjacent the at least two cylindrical cam element crests (272), the fifth position at a further rotation counter to the first direction (502) of the cam shaft (132), the stator face (154) contacting the rotor (120) at pressures transitioning from the single higher pressure to the single high pressure during the rotation of the cam shaft (132) from the fourth position to the fifth position, the spring (136) at the first height (196) in the fifth position.

11. The valve of claim 10 wherein the valve has a higher pressure arrangement, the higher pressure arrangement operating at the single higher pressure;

the high pressure arrangement comprising each of the at least two cam shaft crests positioned in one of the cylindrical cam element troughs (286) and the spring (136) maintained at a first height (196), the spring (136) providing the entirety of the force in the high pressure arrangement to bias the rotor (120) against the stator face (154) and without application of any additional load applied on the spring (136);

the higher pressure arrangement comprising the cylindrical cam element stopping element (156) contacting the valve body cylindrical keyed passageway key (164) to arrest rotation of the cylindrical cam element (124) relative to the cam shaft (132) in a first direction (502) and each of the at least two cam shaft crests positioned atop one of the cylindrical cam element crests (272), the cam shaft (132) at a first deflection distant the rotor (120), the spring (136) maintained at a second height (298) wherein the first height (196) is greater than the second height (298) by the first deflection;

wherein the valve (100) is adapted to move from the high pressure arrangement to the higher pressure arrangement by rotation in the first direction (502) of the cam shaft (132) while the cylindrical cam element stopping element (156) contacts the valve body cylindrical keyed passageway key (164) and precludes rotation of the rotor (120) relative to the stator face (154); and wherein the valve is adapted to move from the higher pressure arrangement to the high pressure arrangement by rotation in the first direction (502) of the cam shaft (132) while the cylindrical cam element stopping element (156) contacts the valve body cylindrical keyed passageway key (164) and precludes rotation of the rotor (120) relative to the stator face (154) until each of the at least two cam shaft crests is positioned in one of the cylindrical cam element troughs (286).

12. The valve of claim 10 wherein the at least two cam shaft crests (276) comprises four cam shaft crests (276) and the at least two cylindrical cam element crests (272) comprises four cylindrical cam element crests (272); and the valve having a first position, a second position, a third position, a fourth position and a fifth position, the first position comprising the cylindrical cam element stopping element (156) adjacent the valve body cylindrical keyed passageway key (164) and the four cam shaft crests (276) laterally adjacent the four cylindrical cam element crests (272), and the spring (136) maintained at a first height (196) and providing a high pressure interface between the rotor (120) and the stator face (154), the high pressure interface at the high pressure;

the second position comprising the cylindrical cam element stopping element (156) adjacent a valve body cylindrical keyed passageway second key (166) and the four cam shaft crests (276) laterally adjacent the four cylindrical cam element crests (272), and the spring (136) maintained at the first height (196), the second position being a forty-five degree rotation in a first direction of the cam shaft (132) and the cylindrical cam element (124) from the first position, the stator face (154) contacting the rotor (120) in the second position, the stator face (154) contacting the rotor (120) at the high pressure interface during the rotation in the first direction of the rotor (120) and the cylindrical cam element (124) from the first position to the second position and in the second position;

the third position comprising the cylindrical cam element stopping element (156) adjacent the valve body cylindrical keyed passageway key (164) and the four cam shaft crests (276) laterally adjacent the four cylindrical cam element crests (272), and the spring (136) maintained at the first height (196) and providing the high pressure interface between the rotor (120) and the stator face (154), the third position being a forty-five degree rotation opposite the first direction of the cam shaft (132) and the cylindrical cam element (124) from the second position, the third position configured to facilitate injection of the valve, the stator face (154) contacting the rotor (120) at the high pressure interface in the third position, the stator face (154) contacting the rotor (120) at the high pressure interface during the rotation opposite the first direction of the cam shaft (132) and the cylindrical cam element (124) from the second position to the third position and in the third position;

the fourth position comprising the cylindrical cam element stopping element (156) adjacent the valve body cylindrical keyed passageway key (164) and the four cam shaft crests (276) atop the four cylindrical cam element crests (272), and the spring (136) maintained at the second height (298) and providing a higher pressure interface between the rotor (120) and the stator face (154), the higher pressure interface at the single higher pressure;

the fourth position being a forty-five degree rotation opposite the first direction of the cam shaft (132) relative to the cylindrical cam element (124), the stator face (154) contacting the rotor (120) at an higher pressure interface in the fourth position; and in the fifth position, the cylindrical cam element stopping element (156) adjacent the valve body cylindrical keyed passageway key (164) and the four cam shaft crests (276) laterally adjacent the four cylindrical cam element crests (272), and the spring (136) maintained at the first height (196);

the fifth position being a further forty-five degree rotation opposite the first direction of the cam shaft (132) relative to the cylindrical cam element (124), the fifth position providing the high pressure interface between the rotor (120) and the stator face (154).

13. The valve of claim 10, further comprising a valve body cylindrical keyed passageway second key (166) in the valve body cylindrical keyed passageway (158) and a cylindrical cam element second stopping element (257) positioned on the cylindrical cam element 124.

14. The valve (100) of claim 10 wherein the at least two cam shaft crests (276) nest the at least two cylindrical cam element troughs (286).

* * * * *